US010776946B2

(12) United States Patent
Yokota et al.

(10) Patent No.: US 10,776,946 B2
(45) Date of Patent: Sep. 15, 2020

(54) IMAGE PROCESSING DEVICE, OBJECT RECOGNIZING DEVICE, DEVICE CONTROL SYSTEM, MOVING OBJECT, IMAGE PROCESSING METHOD, AND COMPUTER-READABLE MEDIUM

(71) Applicant: Ricoh Company, Ltd., Tokyo (JP)

(72) Inventors: Soichiro Yokota, Kanagawa (JP); Seiya Amano, Kanagawa (JP); Yuu Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 161 days.

(21) Appl. No.: 16/046,162

(22) Filed: Jul. 26, 2018

(65) Prior Publication Data
US 2018/0336701 A1  Nov. 22, 2018

Related U.S. Application Data

(63) Continuation of application No. PCT/JP2016/087158, filed on Dec. 14, 2016.

(30) Foreign Application Priority Data

Feb. 8, 2016  (JP) .................................. 2016-021953

(51) Int. Cl.
*G06T 7/73* (2017.01)
*G06T 7/246* (2017.01)
(Continued)

(52) U.S. Cl.
CPC ................ *G06T 7/74* (2017.01); *B60R 21/00* (2013.01); *G06K 9/00805* (2013.01); *G06T 7/00* (2013.01);
(Continued)

(58) Field of Classification Search
CPC .... G06T 7/74; G06T 7/00; G06T 7/20; G06T 7/246; G06T 7/55; G06T 2207/10021;
(Continued)

(56) References Cited

U.S. PATENT DOCUMENTS

2012/0057748 A1* 3/2012 Katano .................. G06T 7/248
382/103
2012/0062749 A1  3/2012 Kawahata
(Continued)

FOREIGN PATENT DOCUMENTS

JP    2005-21 4914    8/2005
JP    2008-158640    7/2008
(Continued)

OTHER PUBLICATIONS

Extended European Search Report dated Dec. 11, 2018 in European Patent Application No. 16889946.6 citing document AX therein, 9 pages.
(Continued)

*Primary Examiner* — Amandeep Saini
(74) *Attorney, Agent, or Firm* — Xsensus LLP

(57) ABSTRACT

An image processing device includes: a predicting unit configured to, from a position of an object in a previous frame with respect to a current frame, predict a position of the object in the current frame and identify a prediction area; a first matching unit configured to perform template matching in the prediction area in the current frame using a first template regarding the object in the previous frame, to detect the object, when the object is present in a first distance area; and a second matching unit configured to perform template matching in the prediction area in the current frame using a second template which is different than the first template and which is regarding the object in the previous frame, to detect
(Continued)

the object, when the object is present in a second distance area which is farther than the first distance area.

20 Claims, 21 Drawing Sheets

(51) Int. Cl.
  *G06T 7/20* (2017.01)
  *G08G 1/16* (2006.01)
  *G06T 7/00* (2017.01)
  *B60R 21/00* (2006.01)
  *G06T 7/55* (2017.01)
  *G06K 9/00* (2006.01)

(52) U.S. Cl.
  CPC ............... *G06T 7/20* (2013.01); *G06T 7/246* (2017.01); *G06T 7/55* (2017.01); *G08G 1/16* (2013.01); *G06T 2207/10021* (2013.01); *G06T 2207/30252* (2013.01); *G06T 2207/30261* (2013.01)

(58) Field of Classification Search
  CPC . G06T 2207/30252; G06T 2207/30261; B60R 21/00; G08G 1/16; G06K 9/00805
  USPC .......................................................... 382/103
  See application file for complete search history.

(56) References Cited

U.S. PATENT DOCUMENTS

| | | | |
|---|---|---|---|
| 2012/0242835 A1 | 9/2012 | Li et al. | |
| 2013/0057924 A1* | 3/2013 | Genda | G06K 9/44 |
| | | | 358/3.27 |
| 2015/0049195 A1 | 2/2015 | Ishigaki et al. | |
| 2015/0165972 A1 | 6/2015 | Takemae et al. | |
| 2015/0294160 A1 | 10/2015 | Takahashi et al. | |
| 2015/0332103 A1 | 11/2015 | Yokota et al. | |
| 2015/0334269 A1 | 11/2015 | Yokota et al. | |
| 2016/0014406 A1 | 1/2016 | Takahashi et al. | |
| 2016/0019429 A1 | 1/2016 | Ishigaki et al. | |
| 2016/0275694 A1* | 9/2016 | Nomura | G06K 9/6215 |
| 2017/0061229 A1* | 3/2017 | Rastgar | G06K 9/46 |

FOREIGN PATENT DOCUMENTS

| | | |
|---|---|---|
| JP | 2008-176504 | 7/2008 |
| JP | 2009-122859 | 6/2009 |
| JP | 2012-059030 | 3/2012 |
| JP | 2012-164275 | 8/2012 |
| JP | 2014-002608 | 1/2014 |
| JP | 2017-021780 | 1/2017 |
| WO | 2017/094300 | 6/2017 |

OTHER PUBLICATIONS

Shinichi Okusako, et al., "Human Tracking with a Mobile Robot using a Laser Range-Finder", Journal of the Robotics Society of Japan, XP055521590, vol. 24, No. 5, Jul. 15, 2006, 4 pages (Reference previously filed. submitting English Abstract only).
International Search Report dated Jan. 31, 2017 in PCT/JP2016/087158 filed on Dec. 14, 2016 (with English Translation).
Written Opinion dated Jan. 31, 2017 in PCT/JP2016/087158 filed on Dec. 14, 2016.
Shinichi Okusako, et al., "Human Tracking with a Mobile Robot using a Laser Range-Finder", Journal of the Robotics Society of Japan, Jul. 15, 2016, vol. 24, No. 5, pp. 43 to 51. (with English Abstract).

* cited by examiner

FIG.12
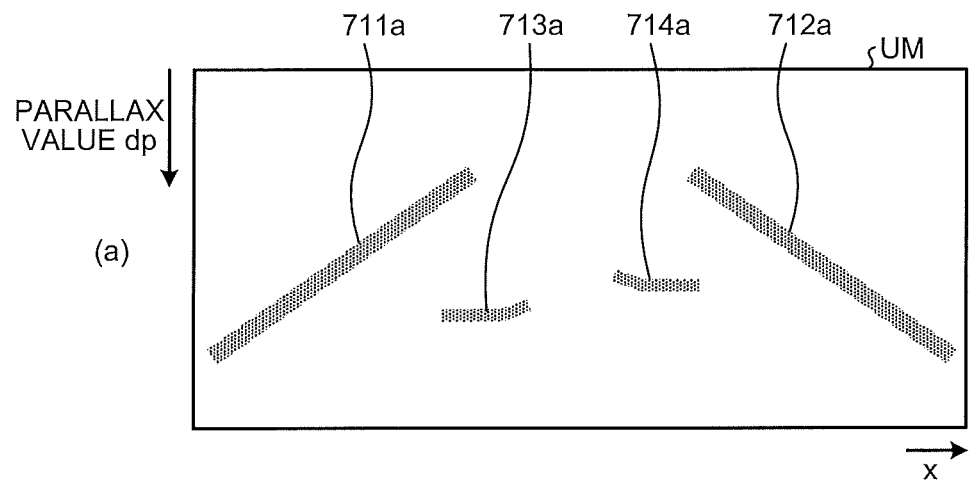
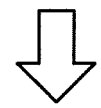
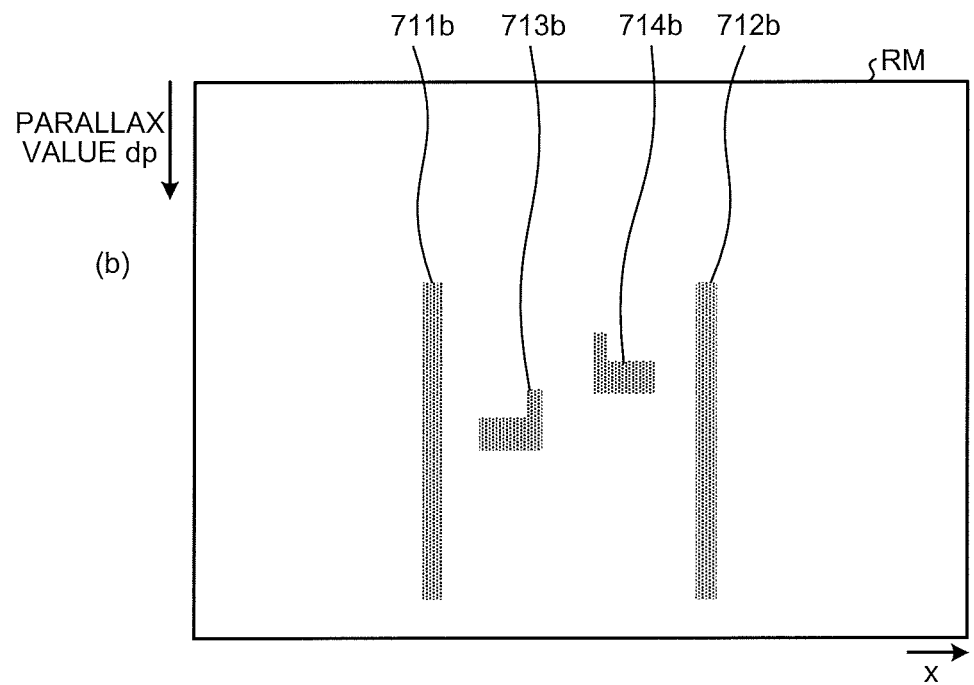

ized having a small amount of variation (i.e., a far object), it is not that the most suitable or the preferred algorithm is implemented, and thus there is a possibility that accurate detection is not possible depending on the distance to the object.

IMAGE PROCESSING DEVICE, OBJECT RECOGNIZING DEVICE, DEVICE CONTROL SYSTEM, MOVING OBJECT, IMAGE PROCESSING METHOD, AND COMPUTER-READABLE MEDIUM

CROSS-REFERENCE TO RELATED APPLICATIONS

The present application is a continuation application of International Application No. PCT/JP2016/087158, filed Dec. 14, 2016, which claims priority to Japanese Patent Application No. 2016-021953, filed Feb. 8, 2016. The contents of these applications are incorporated herein by reference in their entirety.

BACKGROUND OF THE INVENTION

1. Field of the Invention

The present invention relates to an image processing device, an object recognizing device, a device control system, a moving object, an image processing method, and a computer readable medium.

2. Description of the Related Art

Conventionally, regarding the safety of automobiles, the development of automobile body structures has been carried out in terms of how the pedestrian can be protected and how the occupant can be protected in case there is collision between the pedestrian and the automobile. However, in recent years, with the progress in the information processing technology and the image processing technology, techniques for enabling fast detection of persons and automobiles have been developed. Using such techniques, automobiles that automatically apply brakes before colliding with an object and thereby prevent the collision from occurring have been developed. Such automated control of automobiles requires accurate measurement of the distance to an object such as a person or another vehicle. For that purpose, distance measurement using millimeter-wave radar or laser radar as well as distance measurement using a stereo camera has been put to practical use.

Object recognition processing using a stereo camera can be broadly divided into clustering processing and tracking processing. In the clustering processing, an object is newly detected using a luminance image taken particularly in real time and using a parallax image derived from the stereo camera. In the tracking processing, the object detected in the clustering processing is tracked using information of a plurality of frames. In the tracking processing, basically, based on the pattern of parallax values or luminance values in a two-dimensional image, the area similar to an object detected in the previous frame is detected from the current frame using template matching.

As a technique for such tracking processing, a technique in which pedestrians are recognized using template matching has been proposed (for example, Japan Patent Application Laid-open No. 2012-164275).

However, in object recognition, since the amount of variation differs according to the distance to the object, there are times when the object cannot be accurately detected using the same algorithm. In the technique disclosed in Japan Patent Application Laid-open No. 2012-164275, for an object to be recognized having a large amount of variation (i.e., a close object) as well as for an object to be

SUMMARY OF THE INVENTION

According to one aspect of the present invention, an image processing device includes a predicting unit, a determining unit, a first matching unit, and a second matching unit. The predicting unit configured to, from a position of an object in a previous frame with respect to a current frame, predict a position of the object in the current frame and identify a prediction area. The determining unit is configured to determine whether the object is present in a first distance area or in a second distance area which is farther than the first distance area, based on a distance to the object in the previous frame. The first matching unit is configured to perform template matching in the prediction area in the current frame using a first template regarding the object in the previous frame, to detect the object, when the determining unit determines that the object is present in the first distance area. The second matching unit is configured to perform template matching in the prediction area in the current frame using a second template which is different than the first template and which is regarding the object in the previous frame, to detect the object, when the determining unit determines that the object is present in the second distance area.

BRIEF DESCRIPTION OF THE DRAWINGS

FIG. 12 is a diagram illustrating an example of a real U map generated from a U map;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1A:
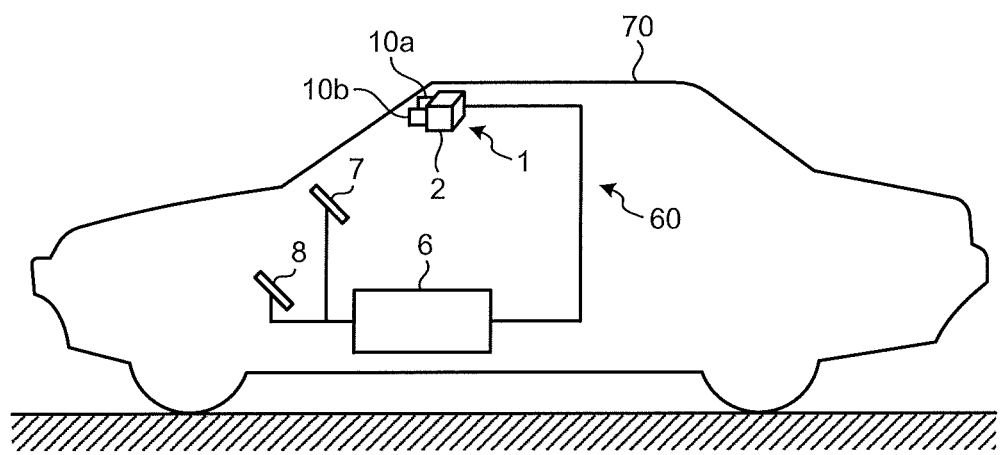
FIGS. 1A and 1B are diagrams illustrating an example in which a device control system according to an embodiment is installed in a vehicle.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an image processing device, an object recognizing device, a device control system, a moving object, an image processing method, and a computer readable medium that enable achieving enhancement in the object detection accuracy.

An embodiment of an image processing device, an object recognizing device, a device control system, an image processing method, and a program according to the present invention is described below in detail with reference to FIGS. 1 to 28. However, the present invention is not limited by the embodiment described below, and in the constituent elements in the embodiment described below, an element easily conceived by one skilled in the art, substantially the same element, and an element within a so-called range of equivalents are included. Further, various omissions, replacements, modifications and combinations can be performed without departing from the gist of the embodiment described below.

(Overall Configuration of Vehicle Including Object Recognizing Device)

Figure 1B:
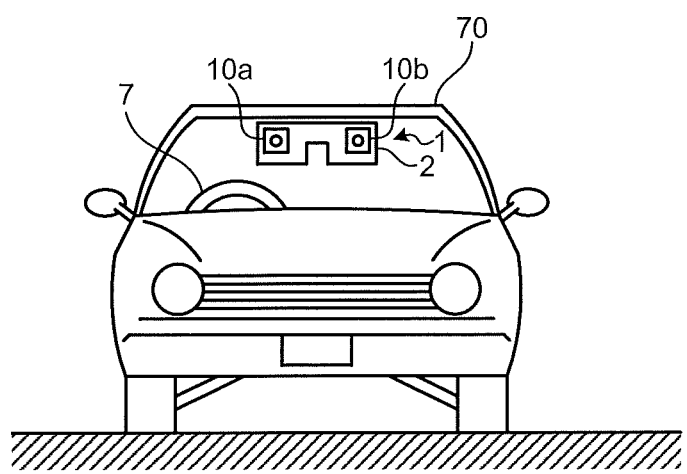

FIGS. 1A and 1B are diagrams illustrating an example in which a device control system according to the embodiment is installed in a vehicle. With reference to FIGS. 1A and 1B, the explanation is given about a vehicle 70 in which a device control system 60 according to the embodiment is installed.

In FIGS. 1A and 1B, FIG. 1A is a lateral view of the vehicle 70 in which the device control system 60 is installed, and FIG. 1B is a front view of the vehicle 70.

As illustrated in FIGS. 1A and 1B, the vehicle 70 that is an automobile has the device control system 60 installed therein. The device control system 60 includes an object recognizing device 1, a vehicle control device 6 (a control device), a steering wheel 7, and a brake pedal 8 that are installed in the vehicle interior that is the cabin space of the vehicle 70.

The object recognizing device 1 has an imaging function for taking images in the travelling direction of the vehicle 70 and is installed, for example, inside the front window of the vehicle 70 and near the rearview mirror. Although the configuration and the operation thereof are described later in detail, the object recognizing device 1 includes a main body 2 and includes imaging units 10a and 10b that are fixed to the main body 2. Herein, the imaging units 10a and 10b are fixed to the main body 2 in such a way that photographing subjects present in the travelling direction of the vehicle 70 are captured in images.

The vehicle control device 6 is an ECU (Electronic Control Unit) that performs a variety of vehicle control based on recognition information received from the object recognizing device 1. As an example of the vehicle control; based on the recognition information received from the object recognizing device 1, the vehicle control device 6 performs steering control in which the steering system (the target for control) including the steering wheel 7 is controlled to avoid obstacles, and performs braking control in which the brake pedal 8 (the target for control) is controlled to make the vehicle 70 decelerate and stop.

Thus, in the device control system 60 that includes the object recognizing device 1 and the vehicle control device 6, by performing the vehicle control such as the steering control and the braking control, the driving safety of the vehicle 70 can be enhanced.

Meanwhile, as described above, the object recognizing device 1 takes images in front of the vehicle 70, but is not limited thereto. That is, the object recognizing device 1 may be installed to take images in the rear of or in the side of the vehicle 70. In that case, the object recognizing device 1 can detect trailing vehicles and persons present in the rear of the vehicle 70 or can detect other vehicles and persons present in the side of the vehicle 70. Then, the vehicle control device 6 can detect risks at the time of lane changing or lane merging of the vehicle 70, and can perform the vehicle control as described above. Moreover, at the time of reversing the vehicle 70 for the parking purpose, if a risk of collision is determined to be present based on the recognition information about the obstacles on the rear side of the vehicle 70 as output by the object recognizing device 1, then the vehicle control device 6 can perform the vehicle control as described above.

(Configuration of Object Recognizing Device)

Figure 2:
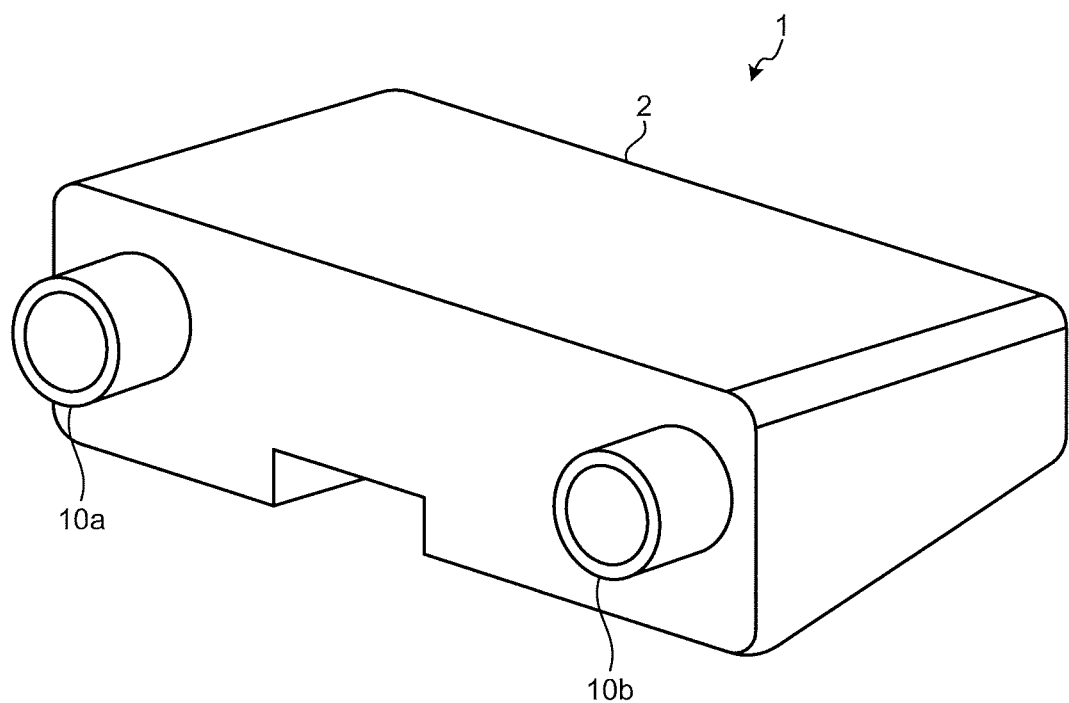
FIG. 2 is a view illustrating an exemplary external appearance of an object recognizing device according to the embodiment.

FIG. 2 is a view illustrating an exemplary external appearance of the object recognizing device according to the embodiment. As illustrated in FIG. 2, the object recognizing device 1 includes the main body 2 and includes the imaging units 10a and 10b fixed to the main body 2 as described above. The imaging units 10a and 10b are configured with a pair of cylindrical cameras that are placed in a rectified manner with respect to the main body 2. Herein, for the purpose of illustration, with reference to FIG. 2, the imaging unit 10a is sometimes referred to as the "right-side camera", and the imaging unit 10b is sometimes referred to as the "left-side camera".

(Hardware Configuration of Object Recognizing Device)

Figure 3:
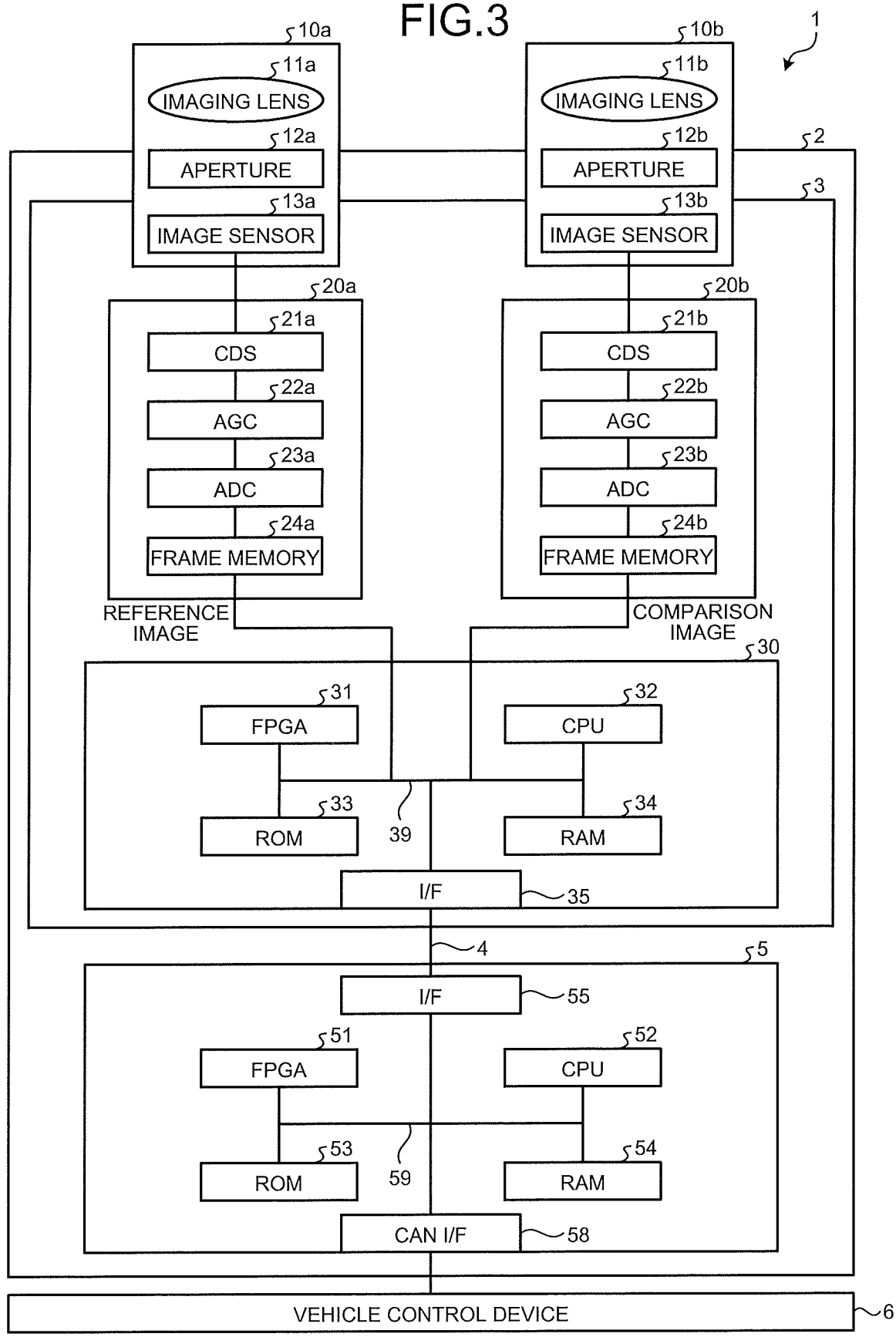
FIG. 3 is a view illustrating an exemplary hardware configuration of the object recognizing device according to the embodiment.

FIG. 3 is a view illustrating an exemplary hardware configuration of the object recognizing device according to the embodiment. Thus, explained with reference to FIG. 3 is a hardware configuration of the object recognizing device 1.

As illustrated in FIG. 3, the object recognizing device 1 includes a parallax value deriving unit 3 and a recognizing unit 5 inside the main body 2.

The parallax value deriving unit 3 is a device that derives, from a plurality of taken images in which an object is captured, a parallax value dp representing the parallax with respect to the object; and outputs a parallax image (an example of parallax information) having the parallax value dp as the pixel value of each pixel. The recognizing unit 5 is a device that, based on the parallax image output by the parallax value deriving unit 3, performs object recognition processing with respect to the objects such as persons and vehicles captured in the taken images; and outputs recognition information, which represents the result of the object recognition processing, to the vehicle control device 6.

As illustrated in FIG. 3, the parallax value deriving unit 3 includes the imaging units 10a and 10b, signal converting units 20a and 20b, and an image processing unit 30.

The imaging unit 10a is a processing unit for taking images of anterior photographic subjects and generating analog image signals. The imaging unit 10a includes an imaging lens 11a, an aperture 12a, and an image sensor 13a.

The imaging lens 11a is an optical element for refracting the incident light and forming an image of an object on the image sensor 13a. The aperture 12a is a member that blocks some of the light which has passed through the imaging lens 11a, and thus adjusts the amount of light input to the image sensor 13a. The image sensor 13a is a semiconductor element that converts the light, which had fallen on the imaging lens 11a and passed through the aperture 12a, into an electrical and analog image signal. The image sensor 13a is implemented using, for example, a solid-state image sensing device such as a CCD (Charge Coupled Device) or a CMOS (Complementary Metal Oxide Semiconductor).

The imaging unit 10b is a processing unit for taking images of anterior photographic subjects and generating analog image signals. The imaging unit 10b includes an imaging lens 11b, an aperture 12b, and an image sensor 13b. Herein, the imaging lens 11b, the aperture 12b, and the image sensor 13b have identical functions to the functions of the imaging lens 11a, the aperture 12a, and the image sensor 13a, respectively, described above. Meanwhile, the imaging lenses 11a and 11b are installed to have their lens faces in the substantially same plane so as to ensure that the right-side camera and the left-side camera take images under the same conditions.

The signal converting unit 20a is a processing unit for converting the analog image signal, which is generated by the imaging unit 10a, into digital image data. The signal converting unit 20a includes CDS (Correlated Double Sampling) 21a, an AGC (Auto Gain Control) 22a, an ADC (Analog Digital Converter) 23a, and a frame memory 24a.

The CDS 21a removes noise from the analog image signal, which is generated by the image sensor 13a, using correlation double sampling, a lateral differential filter, and a vertical smoothing filter. The AGC 22a performs gain control for controlling the intensity of the analog image signal from which noise has been removed by the CDS 21a. The ADC 23a converts the analog image signal, which has been subjected to gain control by the AGC 22a, into digital image data. The frame memory 24a is used to store the image data which is obtained by conversion by the ADC 23a.

The signal converting unit 20b is a processing unit for converting the analog image signal, which is generated by the imaging unit 10b, into digital image data. The signal processing unit 20b includes CDS 21b, an AGC 22b, an ADC 23b, and a frame memory 24b. Herein, the CDS 21b, the AGC 22b, the ADC 23b, and the frame memory 24b having identical functions to the functions of the CDS 21a, the AGC 22a, the ADC 23a, and the frame memory 24a, respectively, described above.

The image processing unit 30 is a device that performs image processing with respect to the image data which has been obtained by conversion by the signal converting units 20a and 20b. The image processing unit 30 includes an FPGA (Field Programmable Gate Array) 31, a CPU (Central Processing Unit) 32, a ROM (Read Only Memory) 33, a RAM (Random Access Memory) 34, an I/F (Interface) 35, and a bus line 39.

The FPGA 31 is an integrated circuit and herein performs processing of deriving the parallax value dp in an image that is formed based on the image data. The CPU 32 controls the various functions of the parallax value deriving unit 3. The ROM 33 is used to store an image processing program that is executed by the CPU 32 for controlling the various functions of the parallax value deriving unit 3. The RAM 34 is used as the work area for the CPU 32. The I/F 35 is an interface for performing communication with an I/F 55 of the recognizing unit 5 via a communication line 4. As illustrated in FIG. 3, the bus line 39 represents an address bus and a data bus that communicably connect the FPGA 31, the CPU 32, the ROM 33, the RAM 34, and the I/F 35 to each other.

Meanwhile, although the image processing unit 30 includes the FPGA 31 as an integrated circuit for deriving the parallax value dp, but is not limited thereto. Alternatively, some other integrated circuit such as an ASIC (Application Specific Integrated Circuit) can be used.

As illustrated in FIG. 3, the recognizing unit 5 includes an FPGA 51, a CPU 52, a ROM 53, a RAM 54, the I/F 55, a CAN (Controller Area Network) I/F 58, and a bus line 59.

The FPGA 51 is an integrated circuit and herein, based on the parallax image received from the image processing unit 30, performs object recognition processing with respect to the objects. The CPU 52 controls the various functions of the recognizing unit 5. The ROM 53 is used to store an object recognition program that is executed by the CPU 52 so that the object recognition processing is performed in the recognizing unit 5. The RAM 54 is used as the work area for the CPU 52. The I/F 55 is an interface for performing data communication with the I/F 35 of the image processing unit 30 via the communication line 4. The CAN I/F 58 is an interface for performing communication with an external controller (such as the vehicle control device 6 illustrated in FIG. 6). As illustrated in FIG. 3, the bus line 59 that is connected to the CAN of the automobile represents, for example, an address bus and a data bus that communicably connect the FPGA 51, the CPU 52, the ROM 53, the RAM 54, the I/F 55, and the CAN I/F 58 to each other.

As a result of such a configuration, when a parallax image is sent from the I/F 35 of the image processing unit 30 to the recognizing unit 5 via the communication line 4, the FPGA 51 follows a command from the CPU 52 of the recognizing unit 5 and, based on the parallax image, performs object recognition processing with respect to the objects such as persons and vehicles captured in the taken images.

Meanwhile, the programs mentioned above can be distributed by recording them as installable or executable files in a computer-readable recording medium. Examples of the recording medium include a CD-ROM (Compact Disk Read Only Memory) and an SD (Secure Digital) memory card.

Moreover, as illustrated in FIG. 3, although the image processing unit and the recognizing unit 5 of the parallax value deriving unit 3 are configured as separate constituent elements, but are not limited thereto. Alternatively, for example, the image processing unit and the recognizing unit 5 can be configured as a single device meant for generating parallax images and performing the object recognition processing.

(Configuration and Operation of Functional Blocks of Object Recognizing Device)

Figure 4:
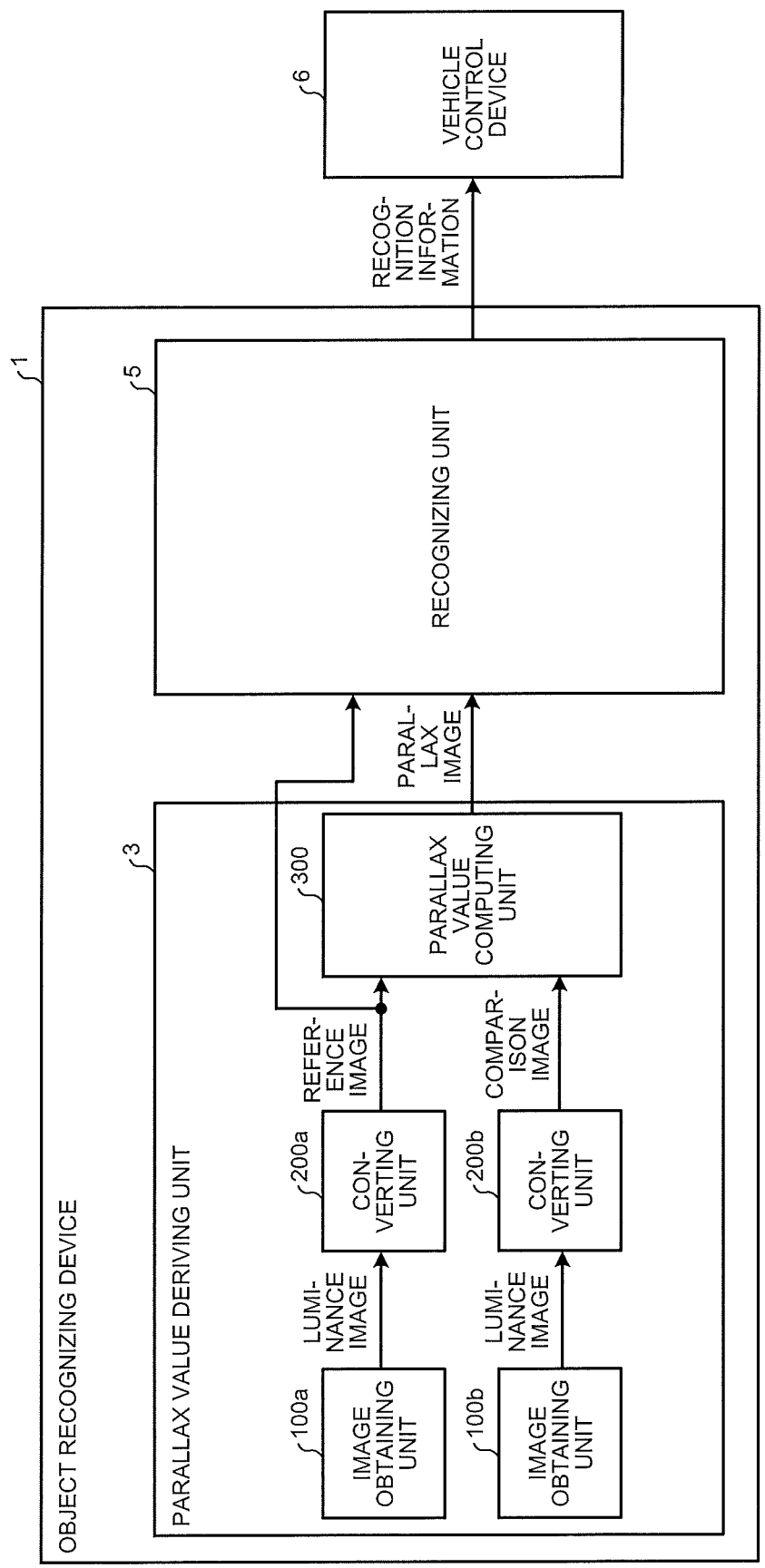
FIG. 4 is a diagram illustrating an exemplary functional block configuration of the object recognizing device according to the embodiment.

FIG. 4 is a diagram illustrating an exemplary functional block configuration of the object recognizing device according to the embodiment. Firstly, explained with reference to FIG. 4 is the configuration and the operation of the main part of the object recognizing device 1.

As described earlier with reference to FIG. 3 too, the object recognizing device 1 includes the parallax value deriving unit 3 and the recognizing unit 5 as illustrated in FIG. 4. The parallax value deriving unit 3 includes an image obtaining unit 100a (a first imaging unit), an image obtaining unit 100b (a second imaging unit), converting units 200a and 200b, and a parallax value computing unit 300 (a generating unit).

The image obtaining unit 100a is a functional unit that takes an image of an anterior photographic subject using the right-side camera; generates an analog image signal; and obtains a luminance image representing an image based on the image signal. The image obtaining unit 100a is implemented using the imaging unit 10a illustrated in FIG. 3.

The image obtaining unit 100b is a functional unit that takes an image of an anterior photographic subject using the left-side camera; generates an analog image signal; and obtains a luminance image representing an image based on the image signal. The image obtaining unit 100b is implemented using the imaging unit 10b illustrated in FIG. 3.

The converting unit 200a is a functional unit that removes noise from the image data of the luminance image obtained by the image obtaining unit 100a; converts the image data into digital image data; and outputs the digital image data. The converting unit 200a is implemented using the signal converting unit 20a illustrated in FIG. 3.

The converting unit 200b is a functional unit that removes noise from the image data of the luminance image obtained by the image obtaining unit 100b; converts the image data into digital image data; and outputs the digital image data. The converting unit 200b is implemented using the signal converting unit 20b illustrated in FIG. 3.

Of the image data of two luminance images (hereinafter, simply referred to as luminance images) output by the converting units 200a and 200b, the luminance image taken by the image obtaining unit 100a representing the right-side camera (the imaging unit 10a) is assumed to be the image data of a reference image Ia (hereinafter, simply referred to as a reference image Ia) (a first taken image); and the luminance image taken by the image obtaining unit 100b representing the left-side camera (the imaging unit 10b) is assumed to be the image data of a comparison image Ib (hereinafter, simply referred to as the comparison image Ib) (a second taken image). That is, based on the two luminance images output by the image obtaining units 100a and 100b, the converting units 200a and 200b output the reference image Ia and the comparison image Ib, respectively.

The parallax value computing unit 300 is a functional unit that, based on the reference image Ia and the comparison image Ib received from the converting units 200a and 200b, respectively, derives the parallax value for each pixel of the reference image Ia; and generates a parallax image in which a parallax value is associated to each pixel of the reference image Ia. Then, the parallax value computing unit 300 outputs the generated parallax image to the recognizing unit 5.

The recognizing unit 5 is a functional unit that, based on the reference image Ia and the parallax image received from the parallax value deriving unit 3, recognizes (detects) objects and tracks the recognized objects (i.e., performs tracking).

<Configuration and Operation of Functional Blocks of Parallax Value Computing Unit>

Figure 5:
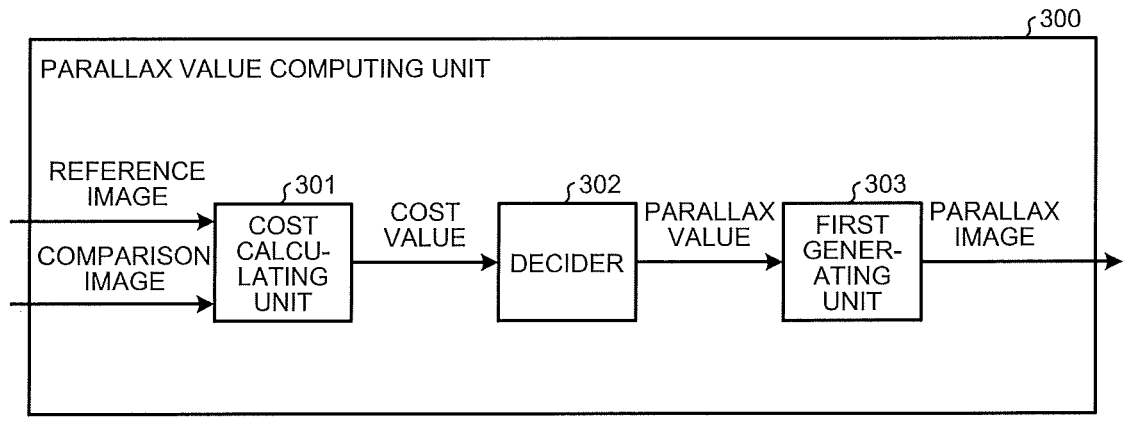
FIG. 5 is a diagram illustrating an exemplary functional block configuration of a parallax value computing unit of the object recognizing device according to the embodiment.
Figure 6:
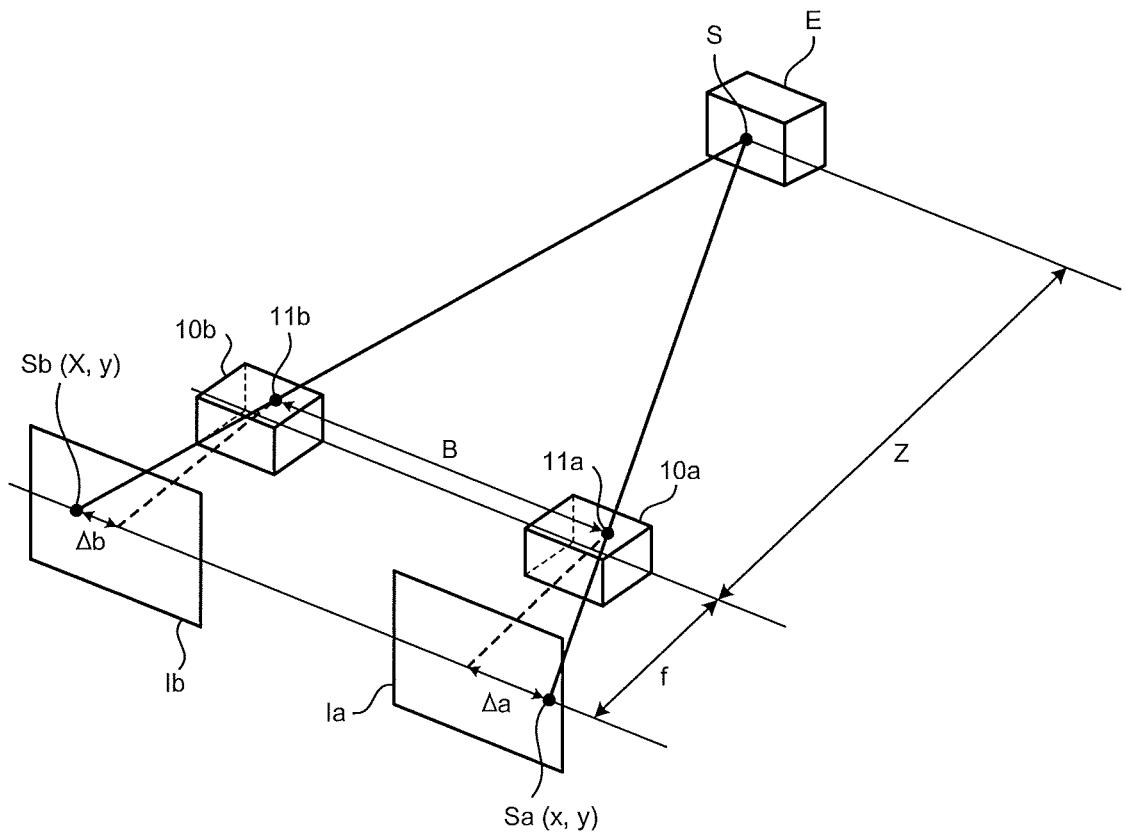
FIG. 6 is a view for explaining the principle for deriving the distance from an imaging unit to an object.
Figure 7:
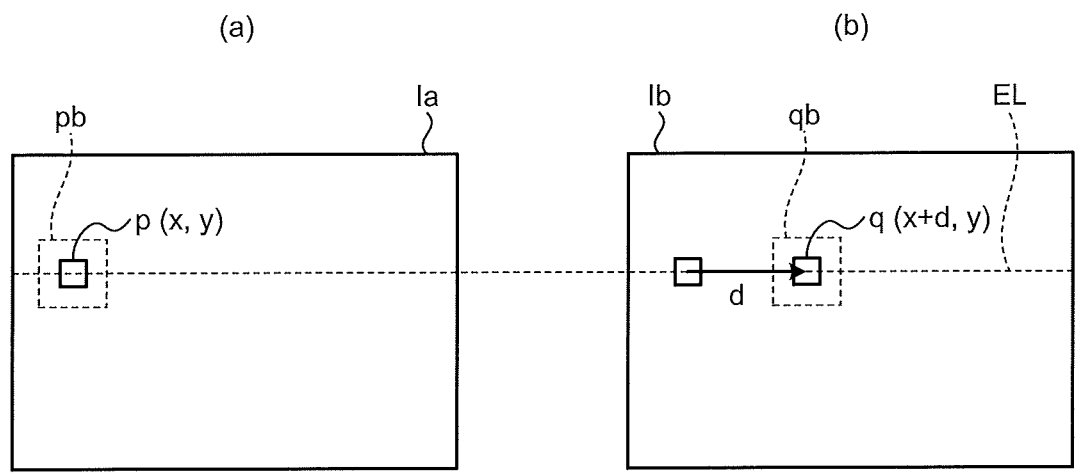
FIG. 7 is an explanatory diagram of a case in which a corresponding pixel in a comparison image which corresponds to a reference pixel in a reference image is obtained.
Figure 8:
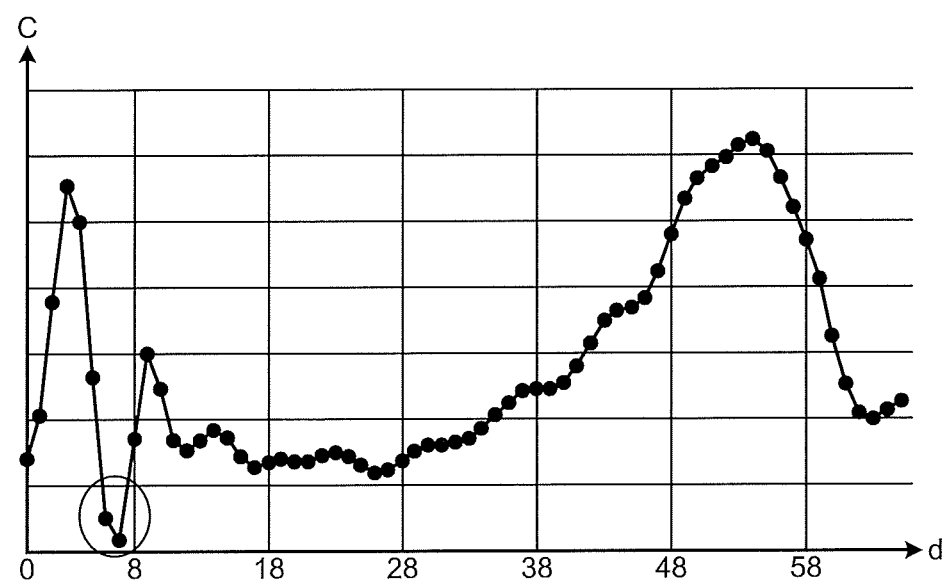
FIG. 8 is a diagram illustrating an exemplary graph of the result of block matching processing.

FIG. 5 is a diagram illustrating an exemplary functional block configuration of the parallax value computing unit of the object recognizing device according to the embodiment. FIG. 6 is a view for explaining the principle for deriving the distance from an imaging unit to an object. FIG. 7 is an explanatory diagram of a case in which a corresponding pixel in a comparison image which corresponds to reference pixel in a reference image is obtained. FIG. 8 is a diagram illustrating an exemplary graph of the result of block matching processing.

Firstly, explained below with reference to FIGS. 6 to 8 is the overview of a distance measurement method implemented using block matching processing.

<<Principle of Distance Measurement>>

With reference to FIG. 6, the explanation is given about the principle by which the parallax with respect to an object is derived from a stereo camera according to stereo matching processing and the distance from the stereo camera to the object is measured using the parallax value indicating the parallax.

An imaging system illustrated in FIG. 6 includes the imaging units 10a and 10b placed in a rectified manner. The imaging units 10a and 10b include the imaging lenses 11a and 11b, respectively, for refracting the incident light and forming an image of the object on respective image sensors representing solid-state imaging devices. The images taken by the imaging units 10a and 10b are referred to as the reference image Ia and the comparison image Ib, respectively. With reference to FIG. 6, a point S of an object E present in the three-dimensional space is mapped at such positions in the reference image Ia and the comparison Ib which lie on a straight line parallel to the straight line joining the imaging lenses 11a and 11b. The point S that is mapped in the reference image Ia is referred to as a point Sa(x, y), and the point S that is mapped in the comparison image Ib is referred to as a point Sb(X, y). At that time, using the point Sa(x, y) present in the coordinates of the reference image Ia and using the point Sb(X, y) present in the coordinates of the comparison image Ib, the parallax value dp is expressed as given below in (Equation 1).

$$dp = X - x \quad \text{(Equation 1)}$$

Moreover, with reference to FIG. 6, if Δa represents the distance between the point Sa(x, y) in the reference image Ia and the point of intersection of the perpendicular dropped from the imaging lens 11a onto the imaging area, and if Δb represents the distance between the point Sb(X, y) in the comparison image Ib and the point of intersection of the perpendicular dropped from the imaging lens 11b onto the imaging area; then the parallax value dp can also be expressed as dp=Δa+Δb.

Subsequently, using the parallax value dp, a distance Z from the imaging units 10a and 10b to the object E is derived. The distance Z represents the distance from the straight line joining the focal positions of the imaging lenses 11a and 11b to the point S on the object E. As illustrated in FIG. 6, the distance Z can be calculated as given below in (Equation 2) using a focal length f of the imaging lenses 11a and 11b, a base length B representing the length between the imaging lenses 11a and 11b, and the parallax value dp.

$$Z = (B \times f)/dp \quad \text{(Equation 2)}$$

According to (Equation 2), it can be understood that, greater the parallax value dp, the shorter is the distance Z; and, smaller the parallax value dp, the longer is the distance Z.

<<Block Matching Processing>>

Explained below with reference to FIGS. 7 and 8 is a distance measurement method based on block matching processing.

With reference to FIGS. 7 and 8, the explanation is given about a method of calculating a cost value C(p, d). In the following explanation, C(p, d) is assumed to express C(x, y, d).

In FIG. 7, a conceptual diagram indicating a reference pixel p and a reference area pb in the reference image Ia is at (a); and a conceptual diagram in the case of calculating the cost value C while sequentially shifting (moving) the candidate for corresponding pixel which is present in the comparison image Ib and which corresponds to the reference pixel p illustrated at (a) in FIG. 2 is at (b). Herein, a corresponding pixel represents such a pixel in the comparison image Ib which is the most similar to the reference pixel p in the reference image Ia. Moreover, the cost value C is an evaluation value (degree of coincidence) representing either the degree of similarity or the degree of dissimilarity of each pixel in the comparison image Ib. In the following explanation, it is assumed that, smaller the cost value C, the more it represents the evaluation value indicating the degree of dissimilarity between a pixel in the comparison image Ib and the reference pixel p.

As illustrated at (a) in FIG. 7, based on the luminance value (the pixel value) of the reference pixel p(x, y) in the reference image Ia and based on the luminance value (the pixel value) of a candidate pixel q(x+d, y) representing a candidate for corresponding pixel present on an epipolar line EL in the comparison image Ib with respect to the reference pixel p(x, y), the cost value C(p, d) is calculated for the candidate pixel q(x+d, y) that is a candidate for corresponding pixel with respect to the reference pixel p(x, y). Herein, d represents the amount of shift (the amount of movement) between the reference pixel p and the candidate pixel q, and the shift amount d is shifted in the unit of pixels. That is, while sequentially shifting the candidate pixel q(x+d, y) one pixel at a time in a pre-specified range (for example, 0<d<25), the cost value C(p, d) representing the degree of dissimilarity between the candidate pixel q(x+d, y) and the reference pixel p(x, y) is calculated. Meanwhile, as the stereo matching processing meant for obtaining the corresponding pixel of the reference pixel p, block matching processing is performed in the embodiment. In the block matching processing, the degree of dissimilarity is obtained between the reference area pb, which represents a predetermined area centered around the reference pixel p in the reference image Ia, and a candidate area qb (having the same size as the reference area pb) centered around the candidate pixel q of the comparison image Ib. As the cost value C representing the degree of dissimilarity between the reference area pb and the candidate area qb; either the SAD (Sum of Absolute Difference) is used, or the SSD (Sum of Squared Difference) is used, or the ZSSD (Zero-mean-sum of Squared Difference) is used that is obtained by subtracting the average value of each block from the SSD value. Regarding such an evaluation value, higher the correlation (i.e., higher the degree of similarity), the smaller is the evaluation value thereby indicating the degree of dissimilarity.

Meanwhile, as described above, since the imaging units 10a and 10b are placed in a rectified manner, the reference image Ia and the comparison image Ib too are in the rectification relationship. Hence, corresponding to the reference pixel p in the reference image Ia, the corresponding pixel in the comparison image Ib happens to be present on the epipolar line EL illustrated as a horizontal line when viewed in FIG. 7. Thus, in order to obtain the corresponding pixel in the comparison image Ib, a search can be performed for such pixels of the comparison image Ib which are present on the epipolar line EL.

The cost value C(p, d) that is calculated in the block matching processing is expressed as, for example, the graph illustrated in FIG. 8 in relationship to the shift amount d. In the example illustrated in FIG. 8, the cost value C is the smallest when the shift amount d=7 holds true. Hence, the parallax value dp=7 is derived.

<<Specific Configuration and Operation of Functional Blocks of Parallax Value Computing Unit>>

Explained below with reference to FIG. 5 is a specific configuration and operation of the functional blocks of the parallax value computing unit 300.

As illustrated in FIG. 5, the parallax value computing unit 300 includes a cost calculating unit 301, a decider 302, and a first generating unit 303.

The cost calculating unit 301 is a functional unit that, based on the luminance value of the reference pixel p(x, y) in the reference image Ia and based on the luminance value of each candidate pixel q(x+d, y) that represents a candidate for corresponding pixel identified by shifting the pixels by the shift amount d from the pixel corresponding to the position of the reference pixel p(x, y) on the epipolar line EL in the comparison image Ib on the basis of the reference pixel p(x, y), calculates the cost value C(p, d) of that candidate pixel q(x+d, y). More particularly, the cost calculating unit 301 performs the block matching processing and calculates, as the cost value C, the degree of dissimilarity between the reference area pb, which represents a predetermined area centered around the reference pixel p in the reference image Ia, and the candidate area qb (having the same size as the reference area pb), which is centered around the candidate pixel q of the comparison image Ib.

The decider 302 is a functional unit for deciding that the shift amount d corresponding to the smallest of the cost values C, which are calculated by the cost calculating unit 301, represents the parallax value dp for such pixels in the reference image Ia for which the cost value C was calculated.

The first generating unit 303 is a functional unit that, based on the parallax values dp determined by the decider 302, generates a parallax image in which the pixel value of each pixel in the reference image Ia is substituted with the parallax value dp corresponding to that pixel.

Meanwhile, the cost calculating unit 301, the decider 302, and the first generating unit 303 illustrated in FIG. 5 are implemented using the FPGA 31 illustrated in FIG. 3. Alternatively, instead of using the FPGA 31 that is a hardware circuit, some or all of the cost calculating unit 301, the decider 302, and the first generating unit 303 can be implemented as a result of execution of programs, which are stored in the ROM 33, by the CPU 32.

Moreover, the cost calculating unit 301, the decider 302, and the first generating unit 303 of the parallax value computing unit 300 illustrated in FIG. 5 are meant to illustrate the functions in a conceptual manner, and the configuration is not limited to the configuration illustrated in FIG. 5. Alternatively, for example, the functional units that are illustrated as independent functional units in the parallax value computing unit 300 in FIG. 5 can be configured as a single functional unit. In contrast, the functions of a single functional unit in the parallax value computing unit 300 illustrated in FIG. 5 can be divided into a plurality of functions, and thus the functional unit can be configured as a plurality of functional units.

<Configuration and Operation of Functional Blocks of Recognizing Unit>

Figure 9:
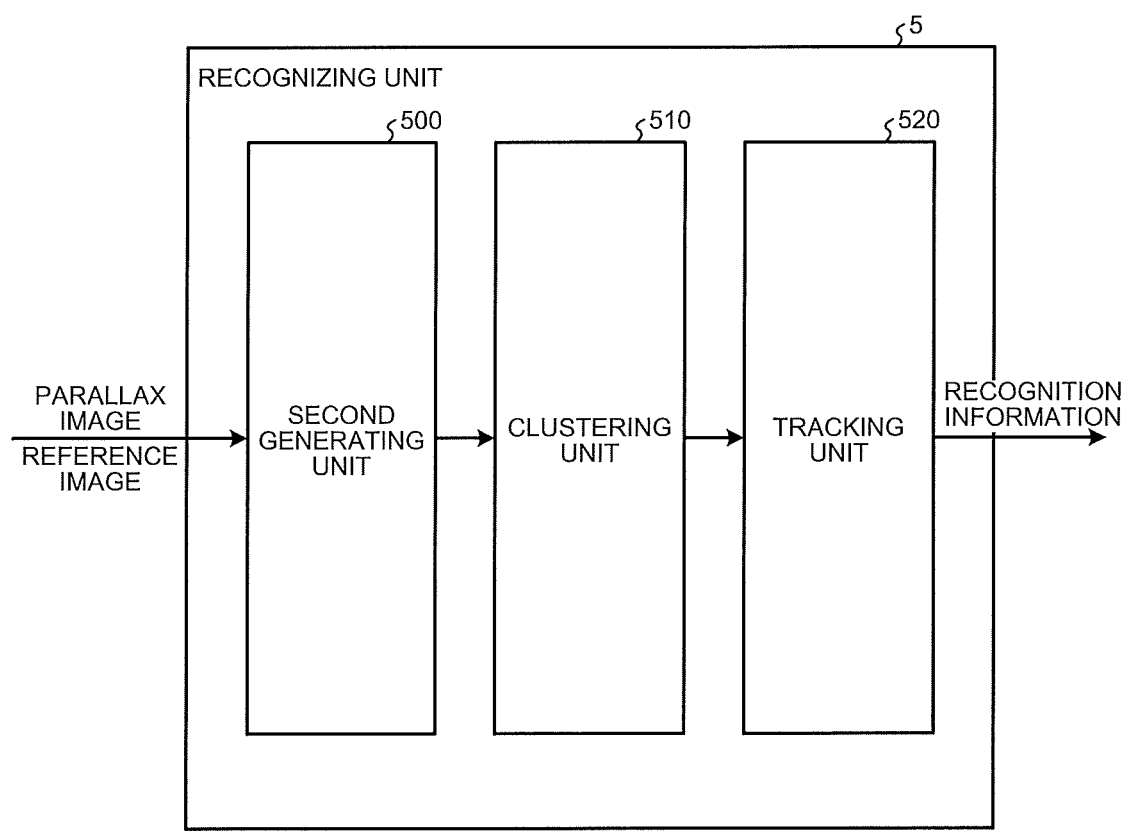
FIG. 9 is a diagram illustrating an exemplary functional block configuration of a recognizing unit of the object recognizing device according to the embodiment.
Figure 10:
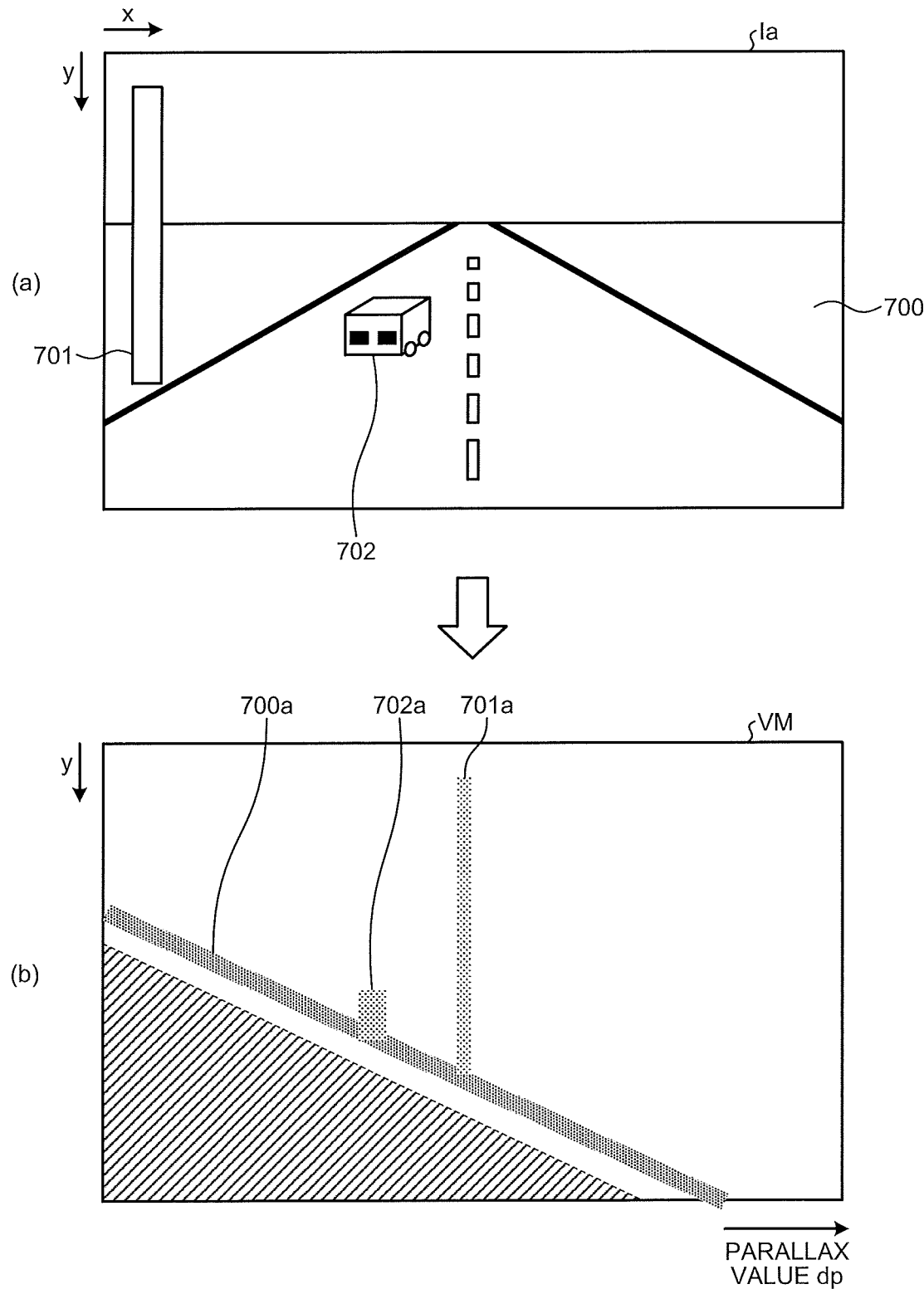
FIG. 10 is a diagram illustrating an example of a V map generated from a parallax image.
Figure 11:
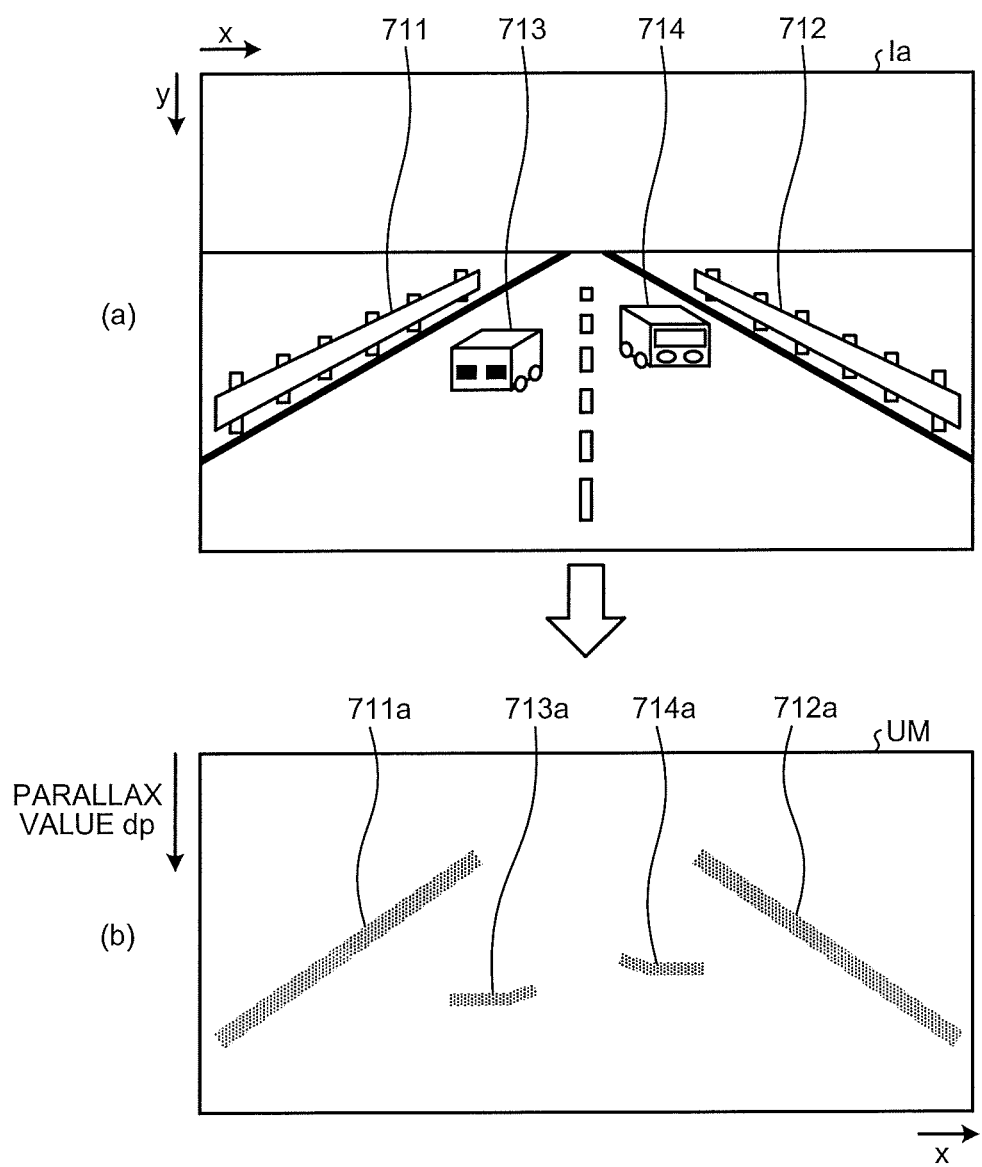
FIG. 11 is a diagram illustrating an example of a U map generated from a parallax image.
Figure 13:
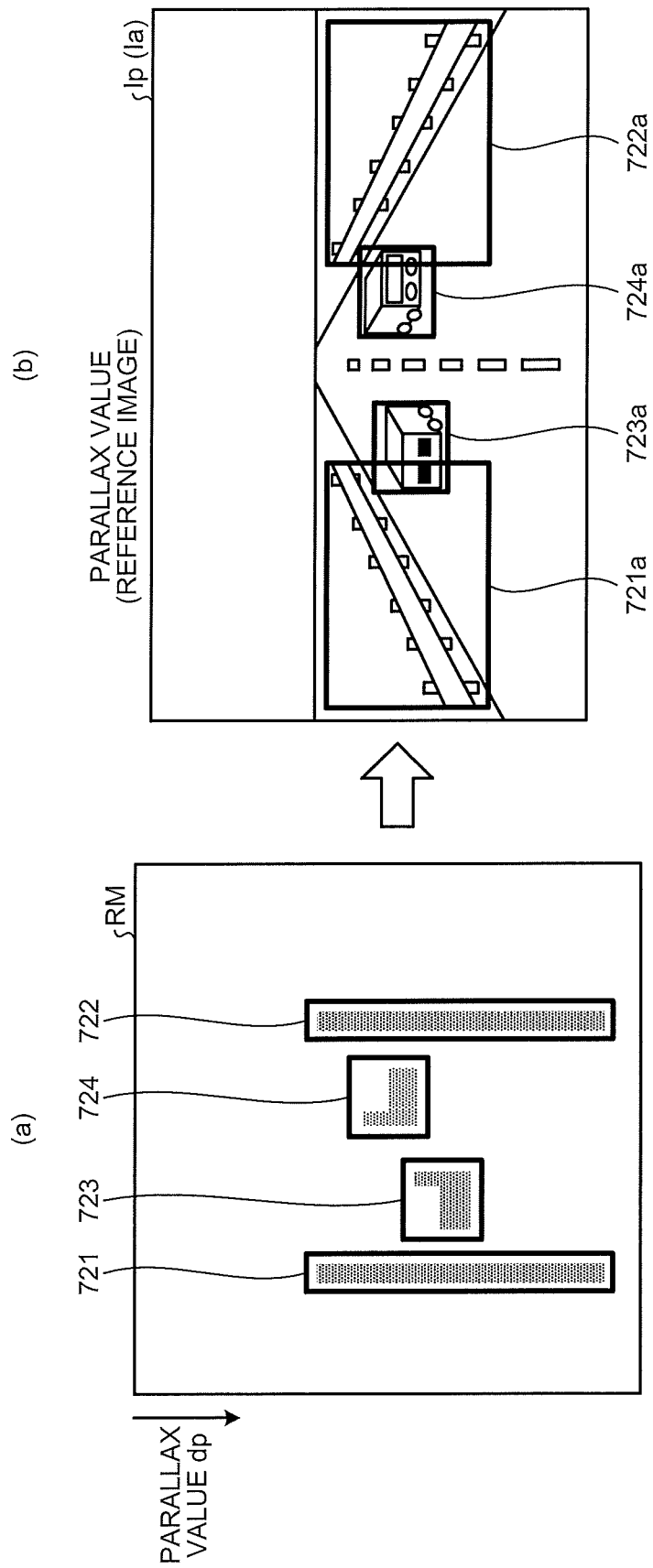
FIG. 13 is a diagram for explaining processing of creating a detection frame.

FIG. 9 is a diagram illustrating an exemplary functional block configuration of the recognizing unit of the object recognizing device according to the embodiment. FIG. 10 is a diagram illustrating an example of a V map generated from a parallax image. FIG. 11 is a diagram illustrating an example of a U map generated from a parallax image. FIG. 12 is a diagram illustrating an example of a real U map generated from a U map. FIG. 13 is a diagram for explaining processing of creating a detection frame. Thus, explained below with reference to FIGS. 9 to 13 is a configuration and operation of the functional blocks of the recognizing unit 5.

As illustrated in FIG. 9, the recognizing unit 5 includes a second generating unit 500, a clustering unit 510 (a detecting unit), and a tracking unit 520.

The second generating unit 500 is a functional unit that receives input of a parallax image from the parallax value computing unit 300; receives input of the reference image Ia from the parallax value deriving unit 3; and generates a V-Disparity map, a U-disparity map, and a Real U-Disparity map. More particularly, the second generating unit 500 generates a V map VM, which is a V-Disparity map illustrated at (b) in FIG. 10, for enabling detection of the road surface from the parallax image input from the parallax value computing unit 300. Herein, a V-Disparity map is a two-dimensional histogram in which the y-axis of the reference image Ia represents the vertical axis and the parallax values dp (or the distances) of the parallax image represent the horizontal axis, and which indicates the frequency distribution of the parallax values dp. In the reference image Ia illustrated at (a) in FIG. 10, for example, a road surface 700, a utility pole 701, and a vehicle 702 are captured. The road surface 700 captured in the reference image Ia corresponds to a road surface portion 700a in the V map VM. Similarly, the utility pole 701 corresponds to a utility pole portion 701a, and the vehicle 702 corresponds to a vehicle portion 702a.

Moreover, the second generating unit 500 refers to the generated V map VM and performs linear approximation with respect to the positions estimated to be of the road surface. If the road surface is flat in nature, then approximation is possible with a single straight line. However, in the case of a road surface having varying road gradients, it becomes necessary to divide the V map VM into sections and then perform linear approximation with accuracy. Herein, the linear approximation can be performed using a known technique such as the Hough transformation or the least-square method. In the V map VM, the utility pole portion 701a and the vehicle portion 702a that represent masses present on the upper side of the detected road surface portion 700a correspond to the utility pole 701 and the vehicle 702 representing the objects on the road surface 700. When a U-Disparity map is generated by the second generating unit 500 (described below), the information about only the portion on the upper side of the road surface is used for noise removal.

Furthermore, the second generating unit 500 refers to the information positioned only on the upper side of the detected road surface in the V map VM, that is, refers to such information in the parallax image which corresponds to a left-side guardrail 711, a right-side guardrail 712, and vehicles 713 and 714 in the reference image Ia illustrated at (a) in FIG. 11; and generates a U map UM that represents a U-Disparity map illustrated at (b) in FIG. 11 and that is to be used in object recognition. The U map UM is a two-dimensional histogram in which the x-axis of the reference image Ia represents the horizontal axis and the parallax values dp (or the distances) of the parallax image represent the vertical axis, and which indicates the frequency distribution of the parallax values dp. The left-side guardrail 711 in the reference image Ia illustrated at (a) in FIG. 11 corresponds to a left-side guardrail portion 711a in the U map UM. Similarly, the right-side guardrail 712 corresponds to a right-side guardrail portion 712a, the vehicle 713 corresponds to a vehicle portion 713a, and the vehicle 714 corresponds to a vehicle portion 714a.

Moreover, the second generating unit 500 generates, from the U map UM generated as illustrated at (a) in FIG. 12, a real U map RM that represents a Real U-Disparity map in which the horizontal axis is converted into the actual range as illustrated at (b) in FIG. 12. Herein, the real U map RM is a two-dimensional histogram in which the actual range in the direction from the imaging unit 10b (the left-side camera) toward the imaging unit 10a (the right-side camera) represents the horizontal axis, and the parallax values dp of the parallax image (or the distances in the depth direction converted from the parallax values dp) represent the vertical axis. The left-side guardrail portion 711a in the U map UM illustrated at (a) in FIG. 12 corresponds to a left-side guardrail portion 711b in the real U map RM. Similarly, the right-side guardrail portion 712a corresponds to a right-side guardrail portion 712b, the vehicle portion 713a corresponds to a vehicle portion 713b, and the vehicle portion 714a corresponds to a vehicle portion 714b. More particularly, in the U map UM, farther the distance (smaller the parallax value dp), the smaller is the object. Hence, there is less information about the parallax value, and the distance resolution is also small. Thus, the second generating unit 500 does not perform thinning. In the case of shorter distances, since the object appears larger, there is more information about the parallax values, and the distance resolution is also large. Thus, the second generating unit 500 performs significant thinning of the pixels and generates the real U map RM. As described later, the clustering unit 510 can extract masses of pixel values (objects) from the real U map RM and detect the objects. In that case, the width of the rectangle enclosing a mass is equivalent to the width of the extracted object, and the height is equivalent to the depth of the extracted object. Meanwhile, the second generating unit 500 is not limited to generating the real U map RM from the U map UM, and can also be configured to generate the real U map RM directly from the parallax image.

Meanwhile, the image input from the parallax value computing unit 3 to the second generating unit 500 is not limited to the reference image Ia, and alternatively the comparison image Ib can be input. Moreover, in the embodiment, the parallax values are treated to be equivalent to the distance values. Hence, the explanation is given for an example using a parallax image as an example of a distance image, but is not limited thereto. Alternatively, for example, distance information of millimeter-wave radar or laser radar and the parallax values can be integrated and then associated with the image coordinates to form a distance image, and the clustering processing can be performed using the distance image.

The clustering unit 510 is a functional unit that, based on the maps input from the second generating unit 500, detects an object appearing in the parallax image. From the generated U map UM or from the generated real U map RM, the clustering unit 510 can identify the position in the x-axis direction and the width (xmin, xmax) of the object in the parallax image and the reference image Ia. Moreover, from height information (dmin, dmax) of the object in the generated U map UM or the generated real U map RM, the clustering unit 510 can identify the actual depth of that object. Furthermore, from the generated V map VM, the clustering unit 510 can identify the position in the y-axis direction and the height (ymin="y-coordinate equivalent to the maximum height from the road surface having the maximum parallax value", ymax="y-coordinate indicating the height of the road surface as obtained from the maximum parallax value") of the object in the parallax image and the reference image Ia. Moreover, from the width (xmin, xmax) in the x-axis direction, the height (ymin, ymax) in the y-axis direction, and the parallax values dp corresponding to the width and the height of the object identified in the parallax image; the clustering unit 510 can identify the actual size of the object in the x-axis direction and the y-axis direction. In this way, the clustering unit 510 can refer to the V map VM, the U map UM, and the real U map RM; and can identify the position, the actual width, the actual height, and the actual depth of the object in the reference image Ia. Moreover, since the position of the object in the reference image Ia is identified, the position of the object in the parallax image also gets decided; and the clustering unit 510 can also identify the distance to the object.

Then, as illustrated at (a) in FIG. 13, in a corresponding manner to detection areas 721 to 724 in the objects identified (detected) in the real U map RM, the clustering unit 510 eventually creates detection frames 721a to 724a in the reference image Ia or a parallax image Ip illustrated at (b) in FIG. 13.

Moreover, from the identified actual size (the width, the height, and the depth) of an object, the clustering unit 510 can identify the type of the object using (Table 1) given below. For example, if the object has the width of 1300 [mm], has the height of 1800 [mm], and has the depth of 2000 [mm]; then the object can be identified to be a "standard-sized vehicle". Meanwhile, the information in which the width, the height, and depth, and the type (object type) of the objects is held in a corresponding manner in (Table 1) can be stored as a table in the RAM 54.

TABLE 1

| Object type | Width | Height | Depth |
| --- | --- | --- | --- |
| Automobile, bicycle | <1100 | <2500 | >1000 |
| Pedestrian | <1100 | <2500 | ≦1000 |
| Compact vehicle | <1700 | <1700 | <10000 |
| Standard-sized vehicle | <1700 | <2500 | <10000 |
| Cargo truck | <3500 | <3500 | <15000 |
| Other | Vehicles not fitting in sizes mentioned above | | |

Unit (mm)

Meanwhile, the second generating unit 500 and the clustering unit 510 of the recognizing unit 5 illustrated in FIG. 9 are implemented using the FPGA 51 illustrated in FIG. 3. Alternatively, instead of using the FPGA 51 that is a hardware circuit, either one or both of the second generating unit 500 and the clustering unit 510 can be implemented as a result of execution of programs, which are stored in the ROM 53, by the CPU 52.

The tracking unit 520 is a functional unit that, based on recognition area information that represents the information related to each object detected (recognized) by the clustering unit 510, performs tracking processing for rejecting that object or tracking that object. A specific configuration of the tracking unit 520 is described later with reference to FIG. 14. Herein, rejection implies excluding the concerned object from the subsequent processing (such as tracking processing). The recognition area information represents the information related to an object recognized by the clustering unit 510 and, for example, contains the following: the position and size of the detected object in the reference image Ia, in the parallax image Ip, in the V-Disparity map, in the U-Disparity map, and in the Real U-Disparity map; the type of the detected object; and the rejection flag.

Meanwhile, the "image processing device" according to the present invention either can imply the tracking unit 520 or can imply the recognizing unit 5 that includes the tracking unit 520.

<<Configuration and Operation of Functional Blocks of Tracking Unit>>

Figure 14:
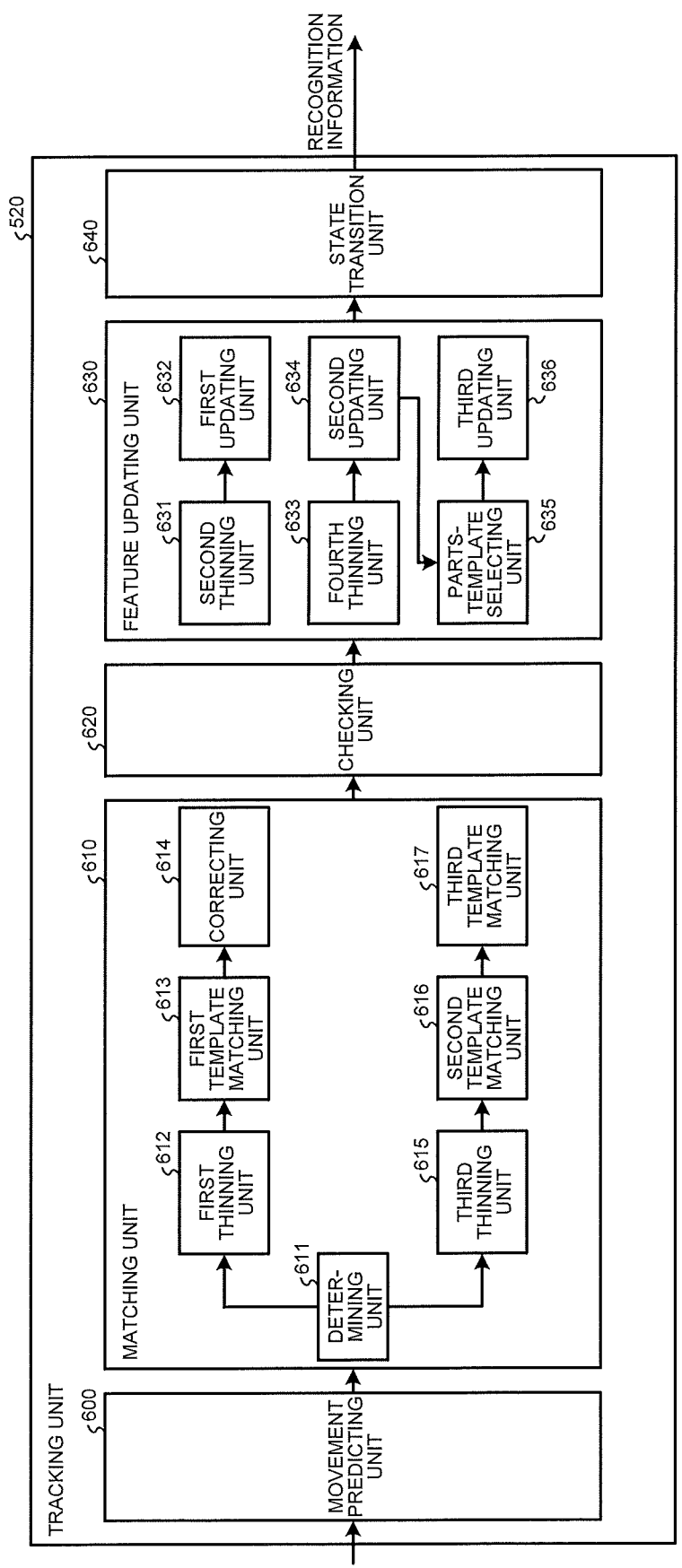
FIG. 14 is a diagram illustrating an exemplary functional block configuration of a tracking unit of the recognizing unit in the object recognizing device according to the embodiment.

FIG. 14 is a diagram illustrating an exemplary functional block configuration of the tracking unit of the recognizing unit in the object recognizing device according to the embodiment. Thus, explained with reference to FIG. 14 is a configuration and operation of the functional blocks of the tracking unit 520 of the recognizing unit 5.

As illustrated in FIG. 14, the tracking unit 520 includes a movement predicting unit 600 (a predicting unit), a matching unit 610, a checking unit 620, a feature updating unit 630, and a state transition unit 640.

The movement predicting unit 600 is a functional unit that refers to the history of the movement and the operation state of an object that is newly detected by the clustering unit 510, and refers to vehicle information; and, for each object that has been tracked till that point of time, predicts such a prediction area in the current luminance image (hereinafter, sometimes simply referred to as "frame") which has a high probability of presence of the object. The movement prediction unit 600 refers to movement information (for example, the relative history position and the relative speed history of the center of gravity) up to the preceding frame (hereinafter, sometimes simply referred to as "previous frame") and refers to the vehicle information, and predicts the movement of the object in the xz plane (x: frame vertical position, z: distance). Meanwhile, in order to deal with an object having the movement beyond prediction, the movement predicting unit 600 can perform processing of expanding the prediction area that was previously predicted. Meanwhile, the movement information can be included in the recognition area information that is detected for each object. In the following explanation, it is assumed that the recognition area information contains the movement information.

The matching unit 610 is a functional unit that performs template matching based on the degree of similarity with the feature quantity (template) in the previous frame as obtained within the prediction area predicted by the movement predicting unit 600, and obtains the position of the object in the frame under consideration (hereinafter, simply referred to as "current frame"). The matching unit 610 includes a determining unit 611 (a determining unit), a first thinning unit 612, a first template matching unit 613, a correcting unit 614, a third thinning unit 615, a second template matching unit 616, and a third template matching unit 617.

The determining unit 611 is a functional unit that, based on the recognition area information up to the previous frame, measures the distance of the object corresponding to the recognition area information and determines whether or not the measured distance is equal to or greater than a predetermined distance. In the following explanation, a distance equal to or greater than the predetermined distance is referred to as "long distance" (a second distance area) and a distance smaller than the predetermined distance is referred to as "short distance" (a first distance area).

The first thinning unit 612 is a functional unit that performs thinning processing, based on a predetermined thinning amount (a first thinning amount), with respect to the image of the prediction area in the current frame as predicted by the movement predicting unit 600.

The first template matching unit 613 is a functional unit that, within the prediction area subjected to thinning by the first thinning unit 612 in the current frame, performs template matching based on the template obtained in the previous frame.

The correcting unit 614 is a functional unit that performs correction processing with respect to the frames (detection frames) of the detection areas (second detection areas) that are detected as a result of template matching performed by the first template matching unit 613. When the correcting unit 614 performs the correction processing with respect to the detection frame of a particular object, the image of the resultant detection frame represents the detection area of that object in the current frame.

Meanwhile, the first thinning unit 612, the first template matching unit 613, and the correcting unit 614 are equivalent to a "first matching unit" according to the present invention.

The third thinning unit 615 is a functional unit that performs thinning processing, based on a predetermined thinning amount (for example, a smaller thinning amount that the thinning amount used in the first thinning unit 612) (a second thinning amount), with respect to the image in the prediction area in the current frame as predicted by the movement predicting unit 600.

The second template matching unit 616 is a functional unit that, within the prediction area subjected to thinning by the third thinning unit 615 in the current frame, performs template matching based on the template obtained in the previous frame.

The third template matching unit 617 is a functional unit that performs template matching based on a parts-template (described later) in the detection area (a fourth detection area) detected in the current frame during the template matching performed by the second template matching unit 616. Based on the position similar to the parts-matching detected by the third template matching unit 617, the detection frame of the object in the current frame gets corrected.

Meanwhile, the third thinning unit 615, the second template matching unit 616, and the third template matching unit 617 are equivalent to a "second matching unit" according to the present invention.

The checking unit 620 is a functional unit that, based on the size of the detection area of the object detected by the matching unit 610, determines whether or not the size corresponds to the size of the object to be tracked (for example, a vehicle).

The feature updating unit 630 is a functional unit that, from the image of the detection area of the object detected in the current frame, creates and updates the feature quantity (template) to be used in the template matching that would be performed in the next frame by the first template matching unit 613 or the second template matching unit 616. The feature updating unit 630 includes a second thinning unit 631 (a first thinning unit), a first updating unit 632, a fourth thinning unit 633 (a second thinning unit), a second updating unit 634, a parts-template selecting unit 635 (a selecting unit), and a third updating unit 636.

The second thinning unit 631 is a functional unit that performs thinning processing, using a predetermined thinning amount (a first thinning amount) in the current frame, with respect to the image of the detection area (a first detection area) of the object as eventually decided by the correcting unit 614; and creates a template (a thinning template) (a first template) to be used in the next frame.

The first updating unit 632 is a functional unit that updates the previously-used thinning template with the thinning template created by the second thinning unit 631 (for example, stores the thinning template in the RAM 54).

The fourth thinning unit 633 is a functional unit that performs thinning processing, using a predetermined thinning amount in the current frame, with respect to the image of the detection area (a third detection area) as eventually decided by the third template matching unit 617; and creates a template (a thinning template) (a second template) to be used in the next frame.

The second updating unit 634 updates the previously-used thinning template with the thinning template created by the fourth thinning unit 633 (for example, stores the thinning template in the RAM 54).

The parts-template selecting unit 635 is a functional unit that, from the image of the detection area of the object as eventually decided in the current frame by the third template matching unit 617, selects a partial image (a parts-template) satisfying predetermined conditions.

The third updating unit 636 is a functional unit that updates the previously-used parts-template with the parts-template selected by the parts-template selecting unit 635 (for example, stores the parts-template in the RAM 54).

The state transition unit 640 is a functional unit that changes the state of the object according to the state of the detection area of the object as eventually decided by the correcting unit 614 or the third template matching unit 617. Then, the state transition unit 640 outputs recognition area information, in which the changed state of the object is reflected, to the vehicle control device 6. For example, if the checking unit 620 determines that the size of the detection area does not correspond to the size of the object to be tracked, then the state transition unit 640 can specify a flag indicating exclusion from the targets for tracking (i.e., indicating rejection) in the recognition area information, and change the state of the object to the state of being a non-target for tracking.

Meanwhile, the movement predicting unit 600; the determining unit 611, the first thinning unit 612, the first template matching unit 613, the correcting unit 614, the third thinning unit 615, the second template matching unit 616, and the third template matching unit 617 of the matching unit 610; the checking unit 620; the second thinning unit 631, the first updating unit 632, the fourth thinning unit 633, the second updating unit 634, the parts-template selecting unit 635, and the third updating unit 636 of the feature updating unit 630; and the state transition unit 640 illustrated in FIG. 14 are implemented using the FPGA 51 illustrated in FIG. 3. Alternatively, instead of using the FPGA 51 that is a hardware circuit, some or all of those functional units can be implemented as a result of execution of programs, which are stored in the ROM 53, by the CPU 52.

Moreover, the functional units of the tracking unit 520 illustrated in FIG. 14 are meant to illustrate the functions in a conceptual manner, and the configuration is not limited to the configuration illustrated in FIG. 14. Alternatively, for example, the functional units that are illustrated as independent functional units in the tracking unit 520 in FIG. 14 can be configured as a single functional unit. In contrast, the functions of a single functional unit in the tracking unit 520 illustrated in FIG. 14 can be divided into a plurality of functions, and thus the functional unit can be configured as a plurality of functional units.

[Operation of Object Recognizing Device]

Explained below with reference to FIGS. 15 to 28 are the specific operation of the object recognizing device 1.

(Block Matching Processing Performed by Parallax Value Deriving Unit)

Figure 15:
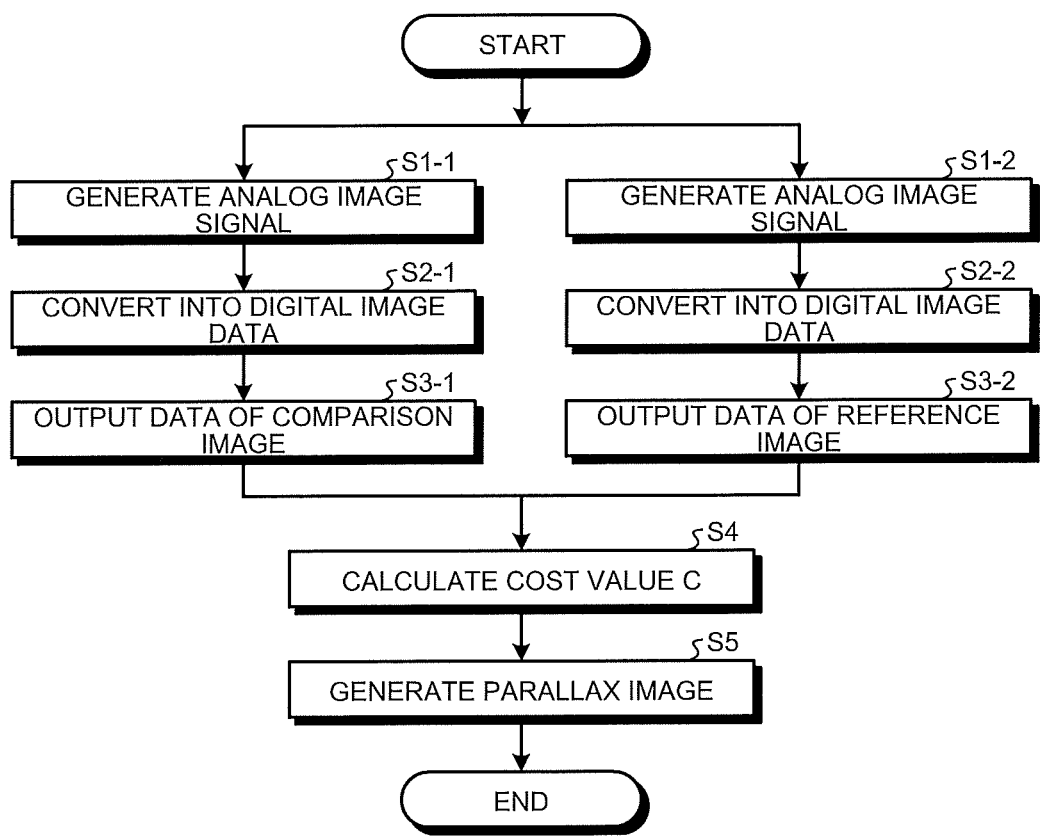
FIG. 15 is a flowchart for explaining an example of the operation in block matching processing performed by a parallax value deriving unit according to the embodiment.

FIG. 15 is a flowchart for explaining an example of the operation in block matching processing performed by the parallax value deriving unit according to the embodiment. Thus, explained with reference to FIG. 15 is a flow of operation in a block matching processing performed by the parallax value deriving unit 3 of the object recognizing device 1.

<Step S1-1>

The image obtaining unit 100b of the parallax value deriving unit 3 takes an image of anterior photographic subjects using the left-side camera (the imaging unit 10b); generates analog image signals; and obtains a luminance image representing an image based on the image signals. With that, image signals to be subjected to subsequent image processing are obtained. Then, the system control proceeds to Step S2-1.

<Step S1-2>

The image obtaining unit 100a of the parallax value deriving unit 3 takes an image of anterior photographic subjects using the right-side camera (the imaging unit 10a); generates analog image signals; and obtains a luminance image representing an image based on the image signals. With that, image signals to be subjected to subsequent image processing are obtained. Then, the system control proceeds to Step S2-2.

<Step S2-1>

The converting unit 200b of the parallax value deriving unit 3 removes noise from the analog image signals obtained by imaging by the imaging unit 10b and converts the analog image signals into digital image data. As a result of converting the analog image signals into digital image data, image processing can be performed on a pixel-by-pixel basis with respect to the image based on the image data. Then, the system control proceeds to Step S3-1.

<Step S2-2>

The converting unit 200a of the parallax value deriving unit 3 removes noise from the analog image signals obtained by imaging by the imaging unit 10a and converts the analog image signals into digital image data. As a result of converting the analog image signals into digital image data, image processing can be performed on a pixel-by-pixel basis with respect to the image based on the image data. Then, the system control proceeds to Step S3-2.

<Step S3-1>

The converting unit 200b outputs the image, which is based on the digital image data obtained by conversion at Step S2-1, as the comparison image Ib to be used in the block matching processing. With that, a comparison image is obtained that is to be used in obtaining the parallax values in the block matching processing. Then, the system control proceeds to Step S4.

<Step S3-2>

The converting unit 200a outputs the image, which is based on the digital image data obtained by conversion at Step S2-2, as the reference image Ia to be used in the block matching processing. With that, a reference image is obtained that is to be used in obtaining the parallax values in the block matching processing. Then, the system control proceeds to Step S4.

<Step S4>

Based on the luminance value of the reference pixel p(x, y) in the reference image Ia and based on the luminance value of each candidate pixel q(x+d, y) that represents a candidate for corresponding pixel identified by shifting the pixels by the shift amount d from the pixel corresponding to the position of the reference pixel p(x, y) on the epipolar line EL in the comparison image Ib on the basis of the reference pixel p(x, y), the cost calculating unit 301 of the parallax value computing unit 300 of the parallax value deriving unit 3 calculates and obtains the cost value C(p, d) of that candidate pixel q(x+d, y). More particularly, the cost calculating unit 301 performs the block matching processing and calculates, as the cost value C, the degree of dissimilarity between the reference area pb, which represents a predetermined area centered around the reference pixel p in the reference image Ia, and the candidate area qb (having the same size as the reference area pb), which is centered around the candidate pixel q of the comparison image Ib. Then, the system control proceeds to Step S5.

<Step S5>

The decider 302 of the parallax value computing unit 300 of the parallax value deriving unit 3 determines the shift amount d corresponding to the smallest of the cost values C, which are calculated by the cost calculating unit 301, to be the parallax value dp for such pixels in the reference image Ia for which the cost value C was calculated. Then, based on the parallax values dp decided by the decider 302, the first generating unit 303 of the parallax value computing unit 300 of the parallax value deriving unit 3 generates a parallax image in which the pixel value of each pixel in the reference image Ia is substituted with the parallax value dp corresponding to that pixel. Then, the first generating unit 303 outputs the generated parallax image to the recognizing unit 5.

Meanwhile, although the block matching processing described above is explained as an example of the stereo matching processing, but is not limited thereto and the processing using the SGM (Semi-Global Matching) method may be applied.

(Tracking Processing Performed by Tracking Unit of Recognizing Unit)

Figure 16:
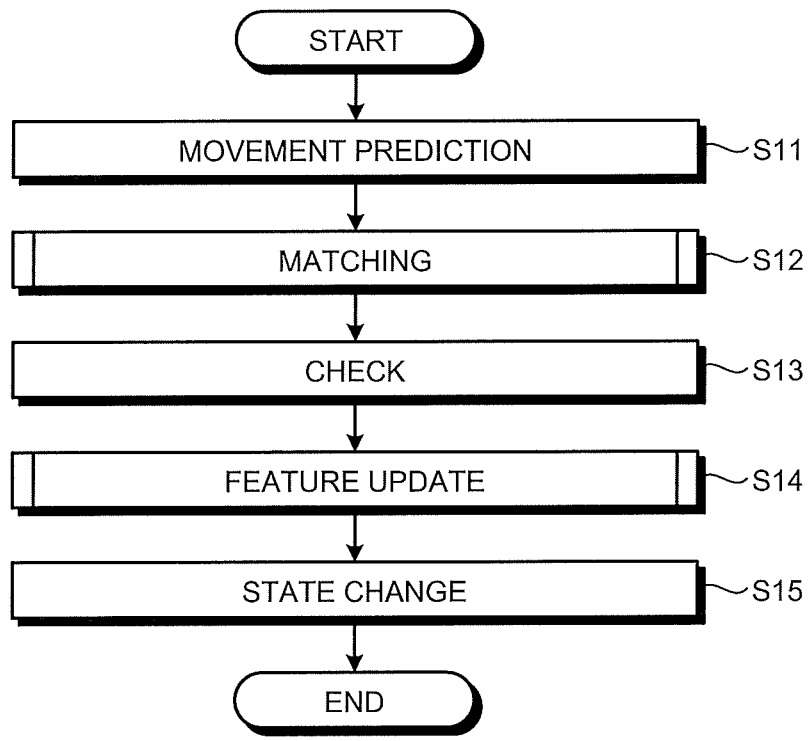
FIG. 16 is a flowchart for explaining an example of the operation in tracking processing performed by the tracking unit of the recognizing unit according to the embodiment.
Figure 17:
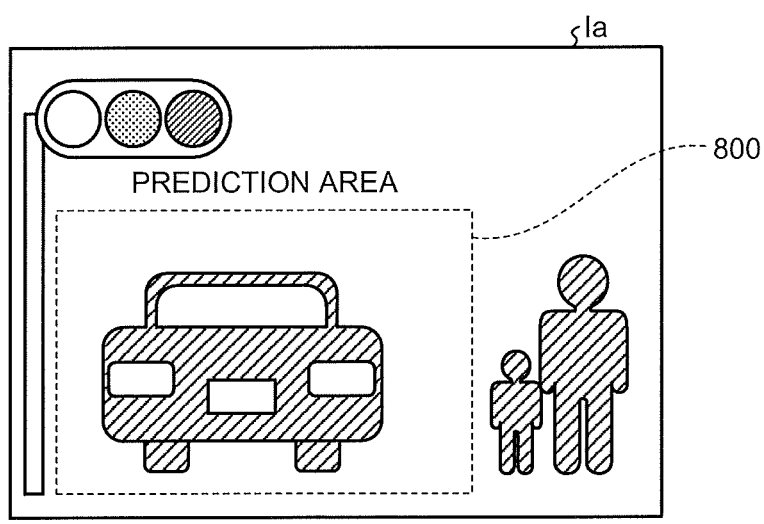
FIG. 17 is a diagram for explaining the operation in movement prediction.

FIG. 16 is a flowchart for explaining an example of the operation in tracking processing performed by the tracking unit of the recognizing unit according to the embodiment. FIG. 17 is a diagram for explaining the operation in movement prediction. Thus, explained with reference to FIGS. 16 and 17 is a flow of operation in tracking processing performed by the tracking unit 520 of the recognizing unit 5.

<Step S11>

The movement predicting unit 600 of the tracking unit 520 refers to the history of movements and operation states of the object that is newly detected by the clustering unit 510 in the previous stage and refers to the recognition area information containing the vehicle information; and, for each object tracked till that point of time, identifies such a prediction area 800 in the current frame (the reference image Ia) which has a high probability of presence of that object as illustrated in FIG. 17. Then, the system control proceeds to Step S12.

<Step S12>

The matching unit 610 of the tracking unit 520 performs template matching based on the degree of similarity with the feature quantity (template) in the prediction area 800 as obtained in the previous frame, and detects the object in the current frame. Meanwhile, the details of the matching processing performed by the matching unit 610 are given later with reference to FIGS. 18, 21, and 27. Then, the system control proceeds to Step S13.

<Step S13>

The checking unit 620 of the tracking unit 520 checks, based on the size of the detection area of the object as detected by the matching unit 610, whether or not the size corresponds to the size of the object (for example, a vehicle) to be tracked. Then, the system control proceeds to Step S14.

<Step S14>

The feature updating unit 630 of the tracking unit 520 creates and updates the feature quantity (template), which is to be used in template matching that would be performed in the next frame by the first template matching unit 613 or by the second template matching unit 616 and the third template matching unit 617, from the image of the detection area of the object as detected in the current frame. The details of the feature updating processing performed by the feature updating unit 630 are given later with reference to FIGS. 19 and 24. Then, the system control proceeds to Step S15.

<Step S15>

The state transition unit 640 of the tracking unit 520 is a functional unit that changes the state of the object according to the state of the detection area of the object as eventually decided by the correcting unit 614 or the third template matching unit 617. Then, the state transition unit 640 outputs recognition area information, in which the changed state of the object is reflected, to the vehicle control device 6.

According to the processing from Step S11 to Step S15, the tracking unit 520 performs the tracking processing. Herein, the processing from Step S11 to Step S15 is performed for the detection area of each object as detected by the clustering unit 510.

(Matching Processing in Tracking Processing)

Figure 18:
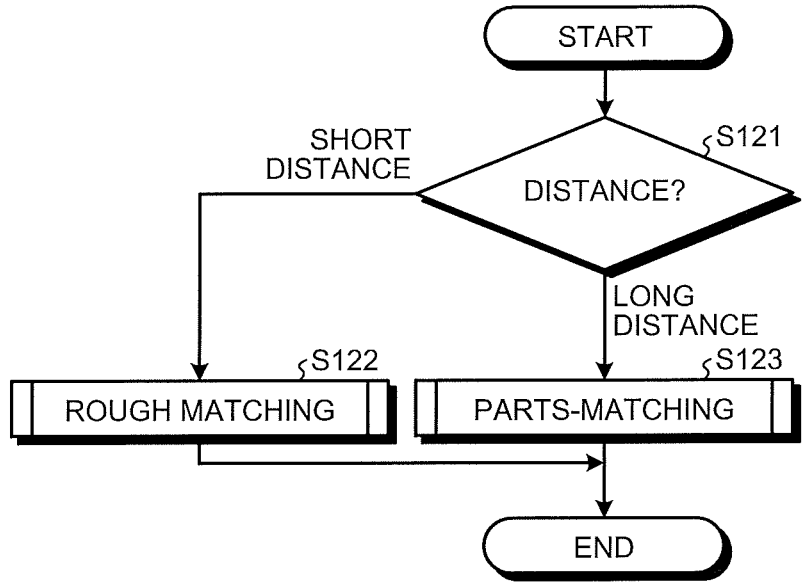
FIG. 18 is a flowchart for explaining an example of the operation in matching processing performed during the tracking processing of the tracking unit according to the embodiment.

FIG. 18 is a flowchart for explaining an example of the operation in matching processing performed during the tracking processing of the tracking unit according to the embodiment. Thus, a flow of operation in matching processing performed by the matching unit 610 of the tracking unit 520 is explained with reference to FIG. 18.

<Step S121>

Based on the recognition area information up to the previous frame, the determining unit 611 of the matching unit 610 measures the distance to the object corresponding to the recognition area information, and determines whether or not the measured distance is equal to or greater than a predetermined distance. If the measured distance is smaller than the predetermined distance thereby indicating a short distance to the object ("short distance" at Step S121), then the system control proceeds to Step S122. However, if the measured distance is equal to or greater than the predetermined distance thereby indicating a long distance to the object ("long distance" at Step S121), then the system control proceeds to Step S123.

<Step S122>

The first thinning unit 612, the first template matching unit 613, and the correcting unit 614 of the matching unit 610 perform rough matching processing using a template based on the detection area detected in the previous frame. The details of the rough matching processing are given later with reference to FIGS. 21 to 23. It marks the end of the matching processing.

<Step S123>

The third thinning unit 615, the second template matching unit 616, and the third template matching unit 617 of the matching unit 610 perform parts-matching processing using a template based on the detection area detected in the previous frame. The details of the parts-matching processing are given later with reference to FIGS. 27 and 28. It marks the end of the matching processing.

As a result of the processing performed at Steps S121 to S123, the matching unit 610 of the tracking unit 520 performs the matching processing (i.e., the matching processing during the tracking processing). Moreover, since the matching processing included in the tracking processing is performed in a repeated manner, regarding an object detected by either of the rough matching processing and the parts-matching processing; there can be times when the type of matching processing is changed according to the distance estimated next. For example, regarding an object for which the rough matching processing has been performed because of having the estimated distance to be a short distance, if the estimated distance increases to a long distance with time, then the matching processing is changed to the parts-matching processing.

(Feature Updating Processing Performed in Case of Performing Rough Matching Processing During Tracking Processing)

Figure 19:
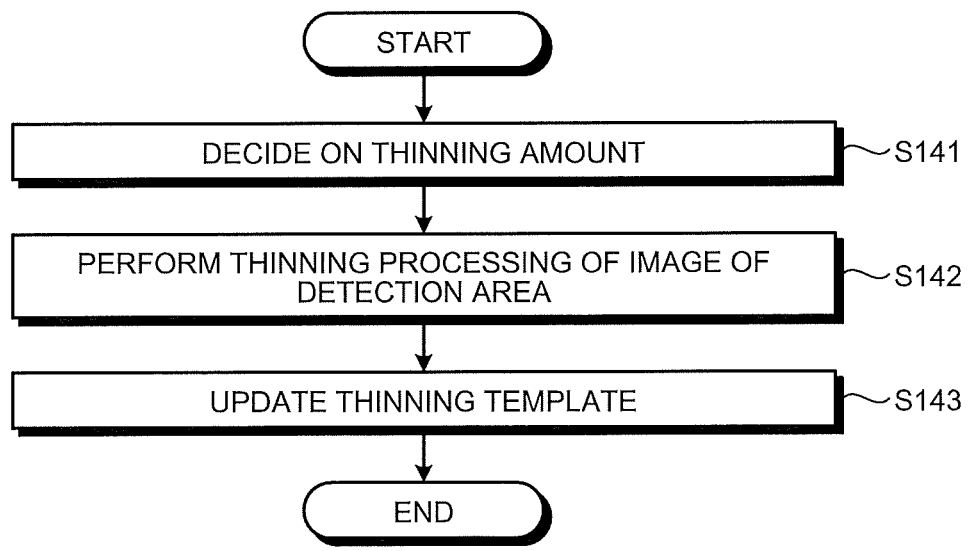
FIG. 19 is a flowchart for explaining an example of the operation in feature updating processing performed in the case in which rough matching is to be performed during the tracking operation of the tracking unit according to the embodiment.
Figure 20:
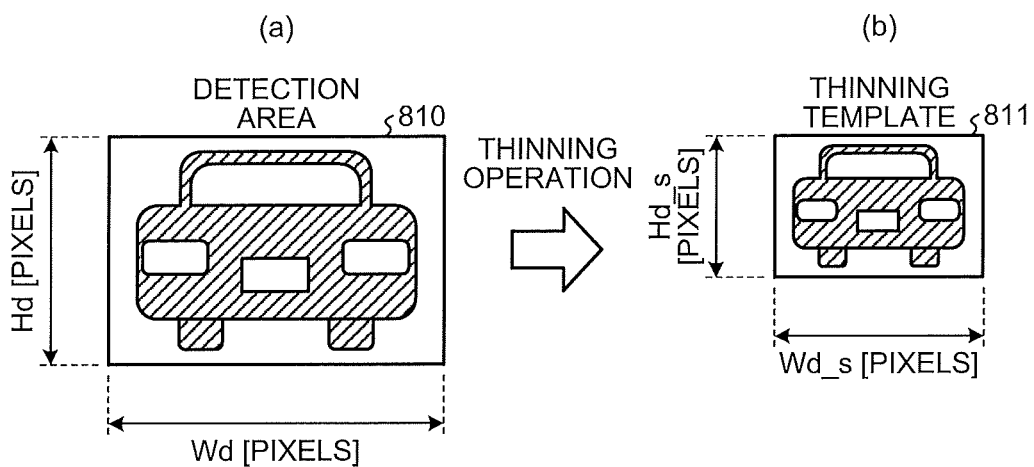
FIG. 20 is a diagram for explaining thinning processing performed with respect to the image of the detection area during the feature updating processing performed when performing rough matching as part of the tracking processing of the tracking unit according to the embodiment.

FIG. 19 is a flowchart for explaining an example of the operation in feature updating processing performed in the case in which rough matching is to be performed during the tracking processing of the tracking unit according to the embodiment. FIG. 20 is a diagram for explaining the thinning processing performed with respect to the image of the detection area during the feature updating processing performed in the case of performing rough matching as part of the tracking processing of the tracking unit according to the embodiment. Thus, explained below with reference to FIGS. 19 and 20 is a flow of operation in a feature updating processing performed by the feature updating unit 630 in the case in which the matching unit 610 performs the rough matching processing. When the rough matching processing is performed at Step S12 illustrated in FIG. 16, the feature updating processing illustrated in FIG. 19 represents the feature updating processing performed at Step S14.

<Step S141>

The second thinning unit 631 of the feature updating unit 630 decides on the thinning amount in the current frame for the purpose of creating a thinning template from the detection area of the object as detected in the rough matching processing performed by the matching unit 610. For example, assume that a detection area 810 illustrated at (a) in FIG. 20 represents the detection area of the object (vehicle) detected in the rough matching processing, and has a width Wd [pixels] in the horizontal direction and has a height Hd [pixels] in the vertical direction. Moreover, assume that a thinning template 811 illustrated at (b) in FIG. 20 represents a post-thinning image obtained as a result of the thinning processing performed by the second thinning unit 631, and has a width Wd_s [pixels] in the horizontal direction and has a height Hd_s [pixels] in the vertical direction. In this case, the second thinning unit 631 performs thinning processing with respect to the detection area 810 in such a way that the height Hd_s of the thinning template 811 becomes equal to a fixed value c [pixels] (where c<Hd holds true) and that the ratio of width and height of the thinning template 811 is identical to the ratio of width and height of the detection area. That is, the thinning amount in the thinning processing performed by the second thinning unit 631, that is, the height Hd_s and the width Wd_s of the thinning template 811 is calculated using (Equation 3) given below.

$$Hd\_s = c$$

$$Wd\_s = (Wd/Hd) \times Hd\_s$$

$$FH = Hd\_s/Hd$$

$$FW = Wd\_s/Wd \quad \text{(Equation 3)}$$

In (Equation 3), FH represents the ratio of the height Hd_s with respect to the height Hd, and FW represents the ratio of the width Wd_s with respect to the width Wd.

In this way, by deciding on the thinning amount in such a way that the height Hd_s of the post-thinning thinning template 811 becomes equal to a fixed value, it becomes possible to reduce the dependence of the processing speed of the matching processing in the next frame on the size of the detection area 810 detected in the current frame. Meanwhile, although the thinning amount is decided in such a way that the height Hd_s of the thinning template 811 becomes equal to a fixed value, but is not limited thereto and the thinning amount may be decided in such a way that the width Wd_s becomes equal to a fixed value. However, when the object is a vehicle, the height is more subject to variation than the width depending on the type of vehicle. Hence, setting the width in the height direction to a fixed value enables achieving prevention of object-dependent variation in the processing speed. Subsequently, the system control proceeds to Step S142.

<Step S142>

Based on the thinning amount decided (calculated) using (Equation 3) given above, the second thinning unit 631 performs thinning processing with respect to the detection area 810 and creates the thinning template 811. Then, the system control proceeds to Step S143.

<Step S143>

The first updating unit 632 of the feature updating unit 630 updates the thinning template used in the previous rough matching processing with the thinning template 811 created by the second thinning unit 631 (for example, stores the thinning template in the RAM 54). The created thinning template 811 is to be used in the rough matching processing that would be performed in the next frame. Moreover, the first updating unit 632 stores the ratios FH and FW, which are calculated using (Equation 3) at Step S141 explained earlier, in the RAM 54. The ratios FH and FW are to be used in the thinning processing (described later) with respect to the image of the prediction area in the next frame. It marks the end of the feature updating processing.

According to the processing from Step S141 to Step S143, the feature updating unit 630 performs the feature updating processing in the case in which the matching unit 610 performs the rough matching processing.

(Rough Matching Processing in Case of Short Distance in Tracking Processing)

Figure 21:
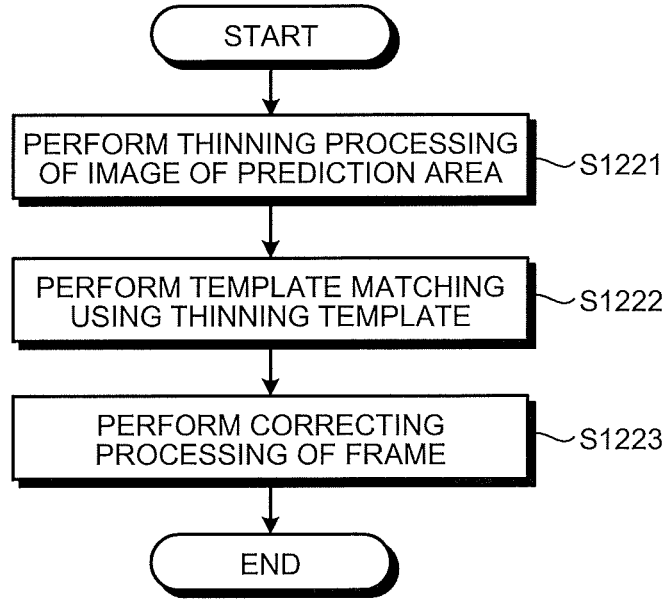
FIG. 21 is a flowchart for explaining an example of the operation in the rough matching processing performed during the tracking processing of the tracking unit according to the embodiment.
Figure 22:
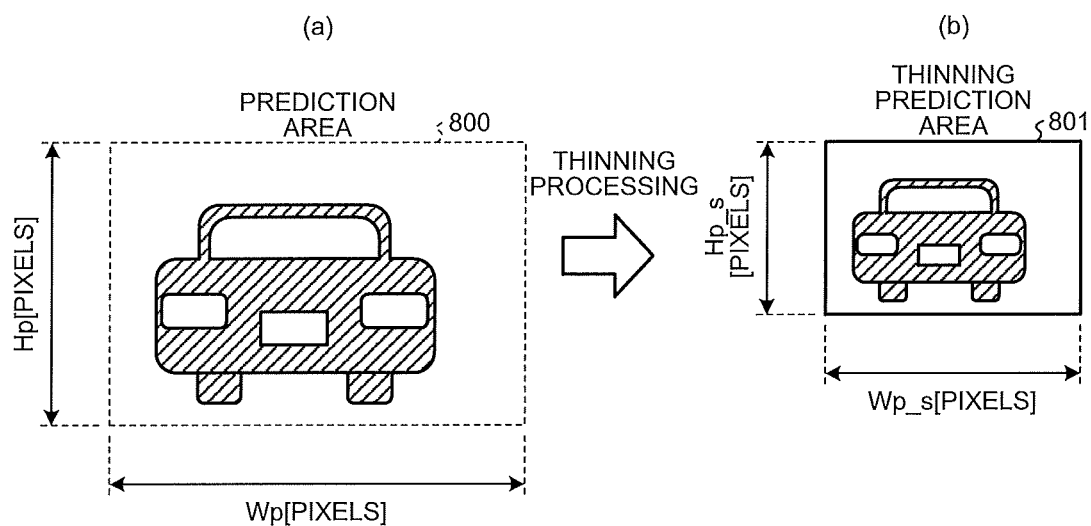
FIG. 22 is a diagram for explaining thinning processing performed with respect to the image of the prediction area and performed as part of the rough matching processing during the tracking processing of the tracking unit according to the embodiment.
Figure 23:
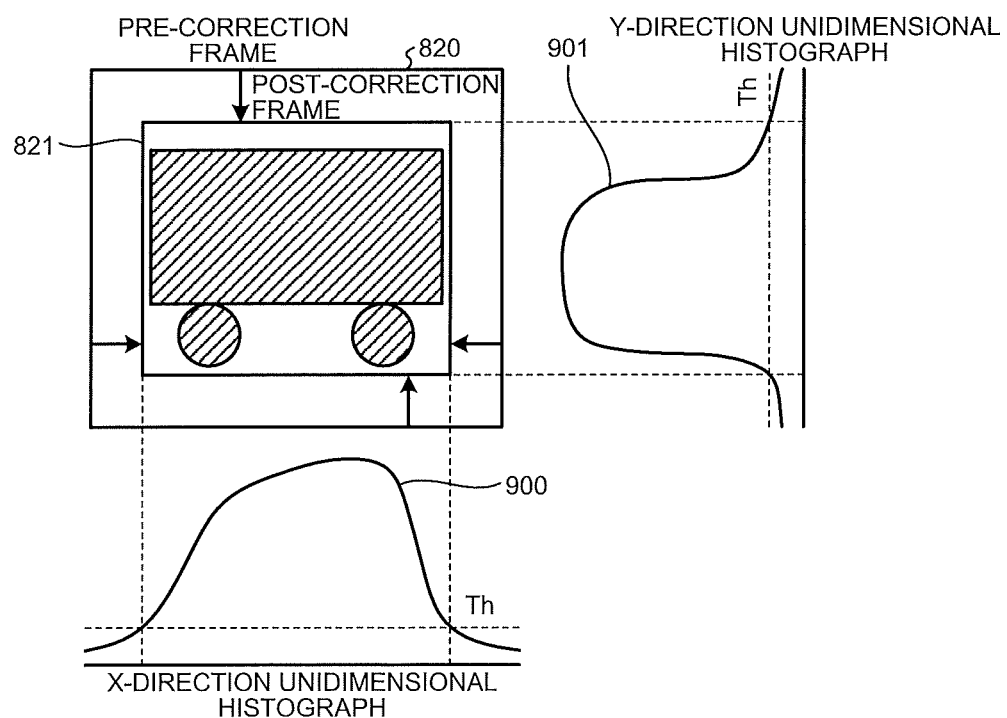
FIG. 23 is a diagram for explaining frame correcting processing performed as part of the rough matching processing during the tracking processing of the tracking unit according to the embodiment.

FIG. 21 is a flowchart for explaining an example of the operation in the rough matching processing performed during the tracking processing of the tracking unit according to the embodiment. FIG. 22 is a diagram for explaining thinning processing performed with respect to the image of the prediction area and performed as part of the rough matching processing during the tracking processing of the tracking unit according to the embodiment. FIG. 23 is a diagram for explaining frame correcting processing performed as part of the rough matching processing during the tracking processing of the tracking unit according to the embodiment. Thus, explained with reference to FIGS. 21 to 23 is a flow of operation in the rough matching processing performed by the matching unit 610 during the tracking processing. The rough matching processing illustrated in FIG. 21 represents the rough matching processing performed at Step S122 illustrated in FIG. 18.

<Step S1221>

The first thinning unit 612 of the matching unit 610 performs thinning processing based on a predetermined thinning amount with respect to the image of the prediction area 800 (see (a) in FIG. 22) predicted in the current frame by the movement predicting unit 600, and obtains a thinning prediction area 801 illustrated at (b) in FIG. 22. More particularly, regarding the previous frame, the first thinning unit 612 uses the ratios FH and FW that are given in (Equation 3) and that are stored in the RAM 54 by the first updating unit 632, and performs thinning processing with respect to the prediction area 800 having a height Hp and a width Wp so as to obtain the thinning prediction area 801 having a height Hp_s and a width Wp_s calculated using (Equation 4) given below.

$$Hp\_s = FH \times Hp$$

$$Wp\_s = FW \times Hp\_s \qquad \text{(Equation 4)}$$

In this way, the ratio of thinning implemented by the first thinning unit 612 with respect to the prediction area 800 in the current frame is identical to the ratio of thinning implemented by the second thinning unit 631 with respect to the detection area 810 in the previous frame. In case the prediction area 800 is subjected to thinning at a different ratio of thinning; then, even if template matching is performed with an object having the same size as the original object, the size of the object differs in the thinning prediction area and thus the object cannot be detected with accuracy. In that regard, the thinning prediction area 801 is created by performing thinning with respect to the prediction area 800 at the same ratio of thinning, thereby enabling detection of the object with accuracy. Subsequently, the system control proceeds to Step S1222.

<Step S1222>

The first template matching unit 613 of the matching unit 610 performs template matching in the thinning prediction area 801, which has been subjected to thinning by the first thinning unit 612, based on the thinning template 811 updated in the previous frame by the first updating unit 632. That is, the first template matching unit 613 detects such an image in the thinning prediction area 801 that is identical or that can be regarded to be identical to the thinning template 811. Herein, in the thinning prediction area 801, as the evaluation value indicating the degree of similarity with the thinning template 811, it is possible to use the SAD. The first template matching unit 613 performs raster scan in the thinning prediction area 801, and at the same time calculates the SAD based on the thinning template 811 and obtains the position of the image having the smallest SAD. As the position of the image having the smallest SAD in the thinning prediction area 801, for example, a position (px_thin, py_thin) of the top left end of that image in the thinning prediction area 801 is obtained.

Moreover, regarding the frame of an image obtained by restoring the frame of the detected image to the pre-thinning size, the first template matching unit 613 calculates, using (Equation 5) given below, a position (px, py) in the prediction area 800 from the position (px_thin, py_thin) of the image detected in the thinning prediction area 801.

$$px = px\_thin \times FW$$

$$py = py\_thin \times FH \qquad \text{(Equation 5)}$$

As a result, the first template matching unit 613 can obtain, in the current frame, the position of the frame (a detection frame 820 illustrated in FIG. 23) of the image (detection area) of the object detected in the prediction area 800, as well as can obtain the position of the detection area in the current frame. In this way, with respect to the thinning prediction area 801 that has been subjected to thinning, the first template matching unit 613 performs template matching with the thinning template 811 that has been subjected to thinning using the same thinning amount. Hence, it becomes possible to perform image processing with respect to the images having a smaller pixel count than the original frame, thereby enabling achieving enhancement in the processing speed.

However, the position of the detection area as obtained in the prediction area 800 represents the position obtained by restoring, to the pre-thinning size, the image detected as a result of template matching performed in the thinning prediction area 801 that is formed by thinning of the prediction area 800. Hence, a quantization error happens to be included. Subsequently, the system control proceeds to Step S1223.

<Step S1223>

The correcting unit 614 of the matching unit 610 performs correction processing with respect to the frame (the detection frame 820 illustrated in FIG. 23) of the image (detection area) of the object that is detected in the current frame as a result of template matching performed by the first template matching unit 613. More particularly, firstly, as illustrated in FIG. 23, regarding an image in the parallax image corresponding to the detection frame 820 detected by the first template matching unit 613 (i.e., the parallax image corresponding to the current frame), the correcting unit 614 creates a histogram 900 indicating the frequency of the pixels having the parallax values in the X axis and creates a histogram 901 indicating the frequency of the pixels having the parallax values in the Y direction. Then, as illustrated in FIG. 23, the correcting unit 614 sets such positions in the X direction which exceed a threshold value Th in the histogram 900 as the positions of the left-side end and the right-side end of a post-correction detection frame 821, and sets such positions in the Y direction which exceed the threshold value Th in the histogram 901 as the positions of the upper end and the lower end of the post-correction detection frame 821. The threshold value Th can be set to be equal to 10% to 20% of the greatest value in the histogram. Meanwhile, with reference to FIG. 23, although the threshold value in the X direction and the threshold value in the Y direction are set to be the same threshold value Th, the threshold values need not be same. In this way, the image of the detection frame 821 that has been subjected to correction by the correcting unit 614 represents the detection area that is eventually detected as a result of rough matching performed by the matching unit 610. Then, the correcting unit 614 specifies, in the recognition area information of the detected object, information about the detection area of that object (i.e., information such as the position and the size with respect to the frame).

In this way, as a result of the correction processing performed by the correcting unit 614 with respect to the detection frame 820 representing the frame of the detection area, it becomes possible to moderate the quantization error mentioned earlier. Moreover, since the template matching by the first template matching unit 613 is performed not with respect to the entire frame but only with respect to the prediction area 800, the processing speed can be enhanced. Herein, it marks the end of the rough matching processing.

According to the processing from Step S1221 to Step S1223, the matching unit 610 performs the rough matching processing.

(Feature Updating Processing Performed in Case of Performing Parts-Matching Processing During Tracking Processing)

Figure 24:
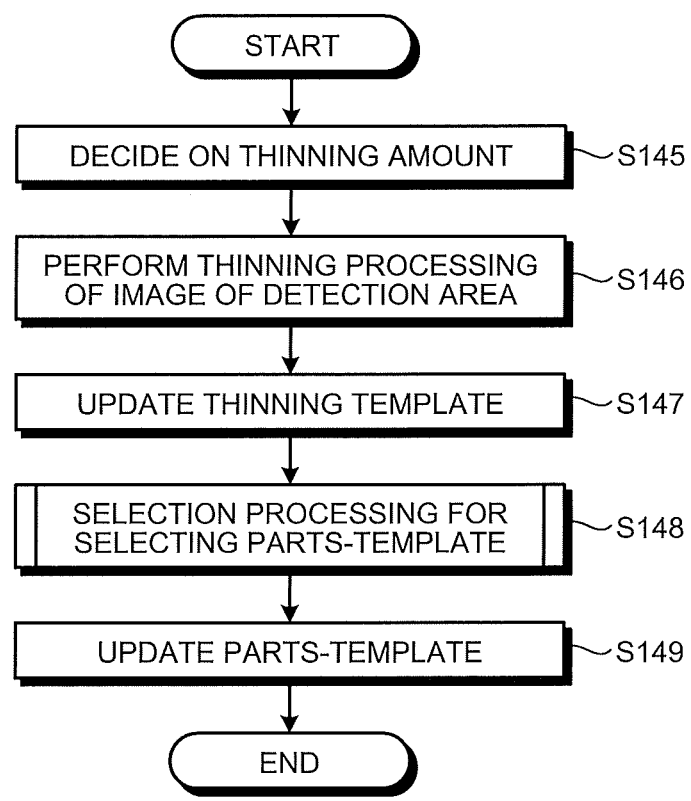
FIG. 24 is a flowchart for explaining an example of the operation in a feature updating processing performed in the case in which parts-matching is to be performed during the tracking processing of the tracking unit according to the embodiment.
Figure 25:
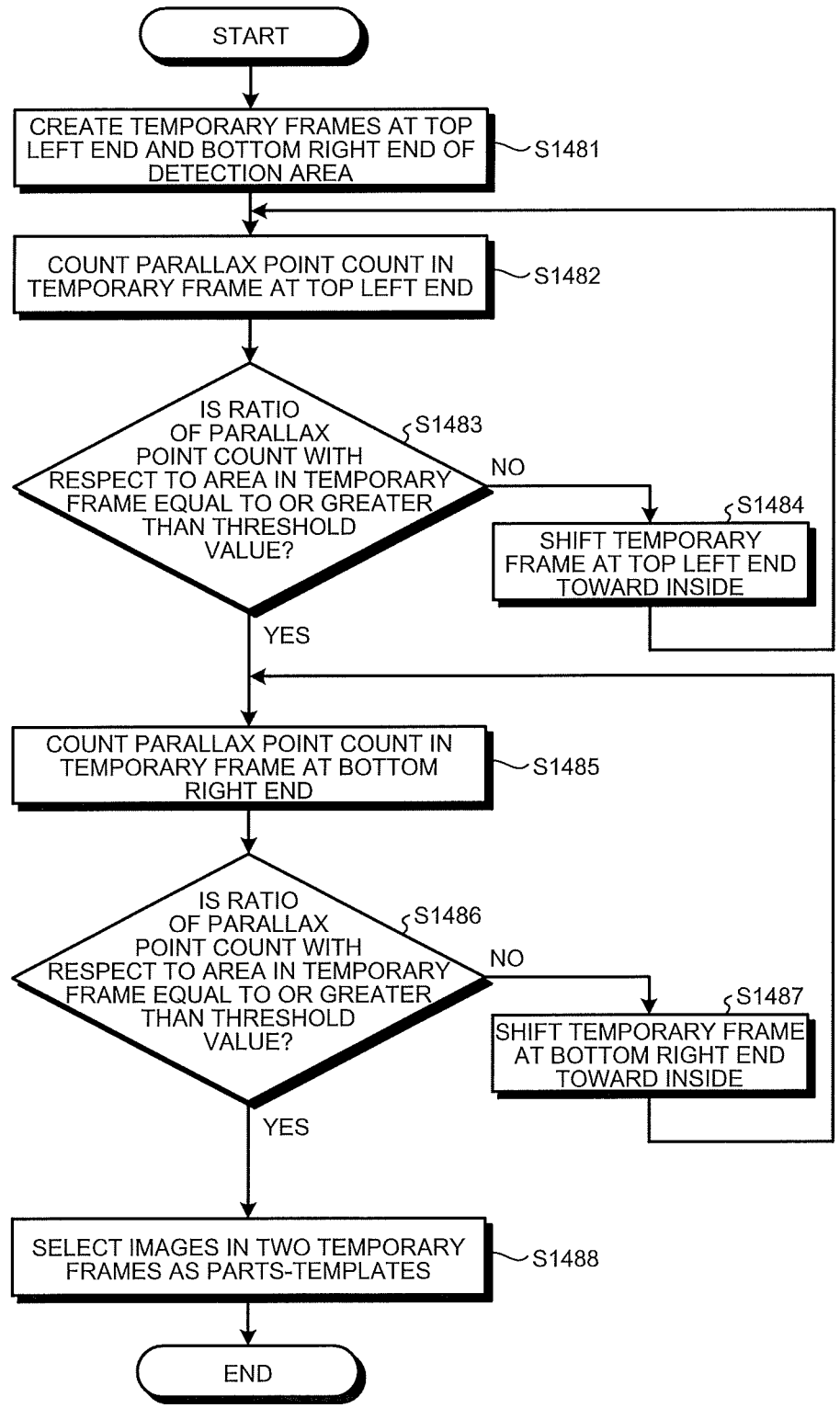
FIG. 25 is a flowchart for explaining an example of the operation in selection processing for selecting a parts-template during the feature updating processing performed in the case in which parts-matching is to be performed during the tracking processing of the tracking unit according to the embodiment.
Figure 26:
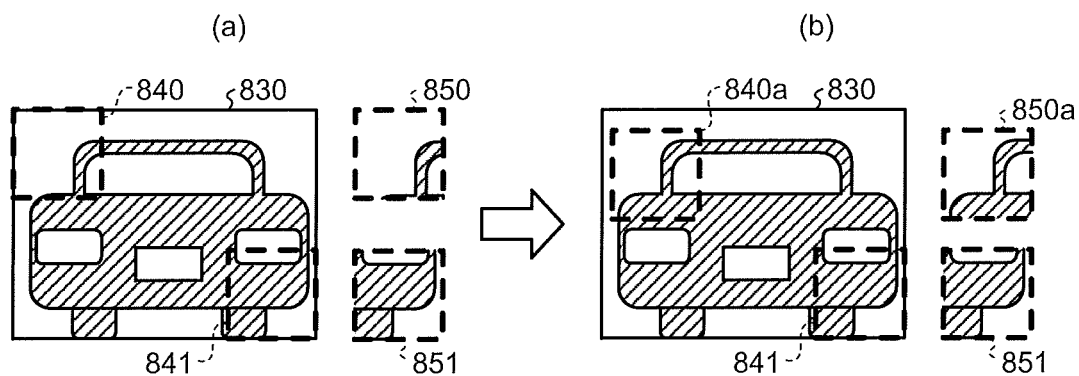
FIG. 26 is a diagram for explaining the selection processing for selecting a parts-template.

FIG. 24 is a flowchart for explaining an example of the operation in feature updating processing performed in the case in which parts-matching is to be performed during the tracking processing of the tracking unit according to the embodiment. FIG. 25 is a flowchart for explaining an example of operation in selection processing for selecting a parts-template during the feature updating processing performed in the case in which parts-matching is to be performed during the tracking processing of the tracking unit according to the embodiment. FIG. 26 is a diagram for explaining the selection processing for selecting a parts-template. Thus, explained below with reference to FIGS. 24 to 26 is a flow of operation in feature updating processing performed by the feature updating unit 630 in the case in which the matching unit 610 performs the parts-matching processing. When the parts-matching processing is performed at Step S12 illustrated in FIG. 16, the feature updating processing illustrated in FIG. 24 represents the feature updating processing performed at Step S14.

<Step S145>

The fourth thinning unit 633 of the feature updating unit 630 decides on the thinning amount in the current frame for the purpose of creating a thinning template from the detection area of the object as detected in the parts-matching processing performed by the matching unit 610. The method for deciding the thinning amount as implemented by the fourth thinning unit 633 is identical to the method for deciding the thinning amount as implemented by the second thinning unit 631 at Step S141 illustrated in FIG. 19. However, the feature updating processing illustrated in FIG. 24 is performed when the determining unit 611 determines that the object is at a long distance, and thus the object appearing in the frame is smaller than in the case of a short distance. Hence, the thinning amount too becomes smaller than the thinning amount used by the second thinning unit 631. For example, the height Hd_s of the thinning template is set to a fixed value that is smaller than the fixed value c. Then, the system control proceeds to Step S146.

<Step S146>

Based on the thinning amount decided (calculated) at Step S145, the fourth thinning unit 633 performs thinning processing with respect to the detection area detected in the current frame; and creates a thinning template. Then, the system control proceeds to Step S147.

<Step S147>

The second updating unit 634 of the feature updating unit 630 updates the thinning template used in the previous parts-matching processing with the thinning template created by the fourth thinning unit 633 (for example, stores the thinning template in the RAM 54). The created thinning template is to be used in the parts-matching processing that would be performed in the next frame. Moreover, the second updating unit 634 stores the ratios FH and FW, which are calculated using (Equation 3) at Step S141 illustrated in FIG. 19, in the RAM 54. The ratios FH and FW are to be used in the thinning processing (described later) of the image of the prediction area in the next frame. Then, the system control proceeds to Step S148.

<Step S148>

The parts-template selecting unit 635 of the feature updating unit 630 selects, from the image of the detection area of the object as eventually decided in the current frame by the third template matching unit 617, a partial image (a parts-template) satisfying predetermined conditions. The selection processing performed by the parts-template selecting unit 635 is described below in detail with reference to the processing performed at Step S1481 to Step S1488 illustrated in FIG. 25 and with reference to FIG. 26.

<<Step S1481>>

The parts-template selecting unit 635 creates, in the current frame, temporary frames 840 and 841 at the top left end and the bottom right end, respectively, in a detection area 830 that is illustrated at (a) in FIG. 26 and that is detected as a result of the parts-matching processing. Then, the system control proceeds to Step S1482.

<<Step S1482>>

The parts-template selecting unit 635 counts the number of pixels having valid parallax values (hereinafter, sometimes called "parallax point count") in an image in the parallax image corresponding to the temporary frame 840 at the top left end of the detection area 830 (i.e., the parallax image corresponding to the current frame). Herein, the pixels having valid parallax values implies, for example, the pixels other than the pixels not having parallax values or the pixels at an extremely long distance, that is, the pixels having extremely small parallax values. Then, the system control proceeds to Step S1483.

<<Step S1483>>

The parts-template selecting unit 635 determines whether or not the ratio of the area occupied by the pixels having the counted parallax point count with respect to the area of the temporary frame 840 is equal to or greater than a threshold value. If the ratio is equal to or greater than the predetermined threshold value (Yes at Step S1483), then the system control proceeds to Step S1485. On the other hand, if the ratio is smaller than the predetermined threshold value (No at Step S1483), then the system control proceeds to Step S1484. For example, in an in-temporary-frame image 850 representing an image in the temporary frame 840 having the state illustrated at (a) in FIG. 26, since there is only a small number of valid parallax values, that is, since the portion of the object (vehicle) included in the in-temporary-frame image 850 is small; it is not possible to perform effective template matching in the parts-matching processing (described later). For that reason, it becomes necessary to perform the processing at Step S1484 described below.

<<Step S1484>>

The parts-template selecting unit 635 shifts the position of the temporary frame 840 in the detection area 830 from the current position toward the inside of the detection area 830 by a predetermined amount. For example, the parts-template selecting unit 635 can shift the position of the temporary frame 840 from the current position to the right-hand side by N number of pixels (where N is a predetermined value) and to the downward side by N number of pixels, or can shift the position of the temporary frame 840 from the current position toward the center of the detection area 830 by a predetermined amount. Then, the system control returns to Step S1482.

<<Step S1485>>

The parts-template selecting unit 635 counts the number of pixels having valid parallax values (i.e., the parallax point count) in an image in the parallax image corresponding to the inside of a temporary frame 841 at the bottom right end of the detection area (i.e., the parallax image corresponding to the current frame). Then, the system control proceeds to Step S1486.

<<Step S1486>>

The parts-template selecting unit 635 determines whether or not the ratio of the area occupied by the pixels having the counted pixel count with the area inside the temporary frame 841 is equal to or greater than a predetermined threshold value. If the ratio is equal to or greater than the predetermined threshold value (Yes at Step S1486), then the system control proceeds to Step S1488. On the other hand, if the ratio is smaller than the predetermined threshold value (No at Step S1486), then the system control proceeds to Step S1487. For example, in an in-temporary-frame image 851 representing an image in the temporary frame 841 in the state illustrated at (a) in FIG. 26, there is a large number of valid parallax values, that is, the portion of the object (vehicle) included in the in-temporary-frame image 851 is large. Hence, it becomes possible to perform effective template matching in the template matching processing (described later).

<<Step S1487>>

The parts-template selecting unit 635 shifts the position of the temporary frame 841 in the detection area 830 from the current position toward the inside of the detection area 830 by a predetermined amount. For example, the parts-template selecting unit 635 can shift the position of the temporary frame 841 from the current position to the left-hand side by N number of pixels (where N is a predetermined value) and to the upward side by N number of pixels, or can shift the position of the temporary frame 841 from the current position toward the center of the detection area 830 by a predetermined amount. Then, the system control returns to Step S1485.

<<Step S1488>>

According to the processing from Step S1481 to Step S1487, the parts-template selecting unit 635 selects, as parts-templates, the images of two temporary frames at the current positions in the detection area 830. In the example illustrated in FIG. 26, in the image inside the temporary frame 840 that was initially created at the top left end in the detection area 830, the ratio of the area occupied by the pixels having the parallax point count is smaller than a predetermined threshold value. Hence, the processing at Step S1484 is performed and an in-temporary-frame image 850a, which is the image of a temporary frame 840a set to have the ratio to be equal to or greater than the predetermined threshold value by shifting the temporary frame 840 toward the inside of the detection area 830 as illustrated at (b) in FIG. 26, is selected as a parts-template. Moreover, in the temporary frame 841 that is initially created at the bottom right end of the detection area 830, the ratio of the pixels having the parallax point count is equal to or greater than the predetermined threshold value. Hence, the in-temporary-frame image 851 that is the image of the temporary frame 841 is selected as a parts-template.

According to the processing from Step S1481 to Step S1488, the parts-template selecting unit 635 performs the selection processing. Then, the system control returns to Step S149 illustrated in the flowchart in FIG. 24.

<Step S149>

The third updating unit 636 of the feature updating unit 630 updates the two parts-templates that were used in the previous parts-matching processing with the two parts-templates selected by the parts-template selecting unit 635 (for example, stores the two parts-templates in the RAM 54). The selected parts-templates are to be used in the parts-matching processing that would be performed in the next frame. It marks the end of the feature updating processing.

According to the processing from Step S145 to Step S149, the feature updating unit 630 performs the feature updating processing in the case in which the matching unit 610 performs the parts-matching processing.

(Parts-Matching Processing Performed in Case of Long Distance During Tracking Processing)

Figure 27:
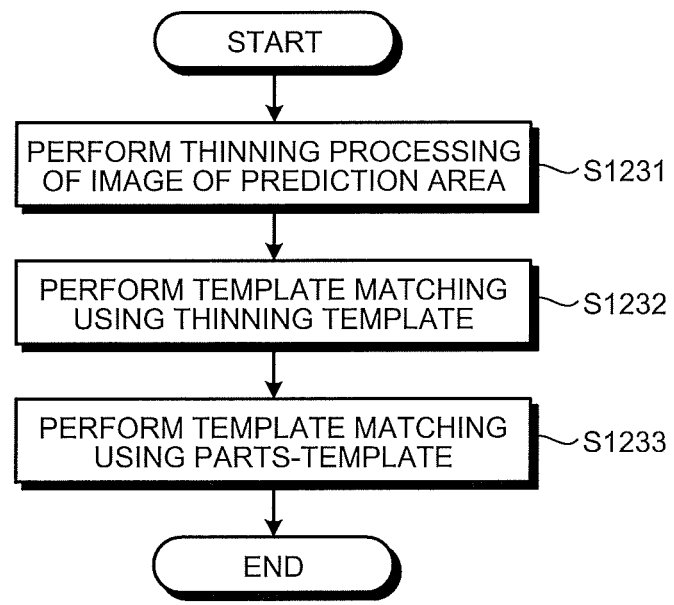
FIG. 27 is a flowchart for explaining an example of the operation in a parts-matching processing performed as part of the tracking processing of the tracking unit according to the embodiment.
Figure 28:
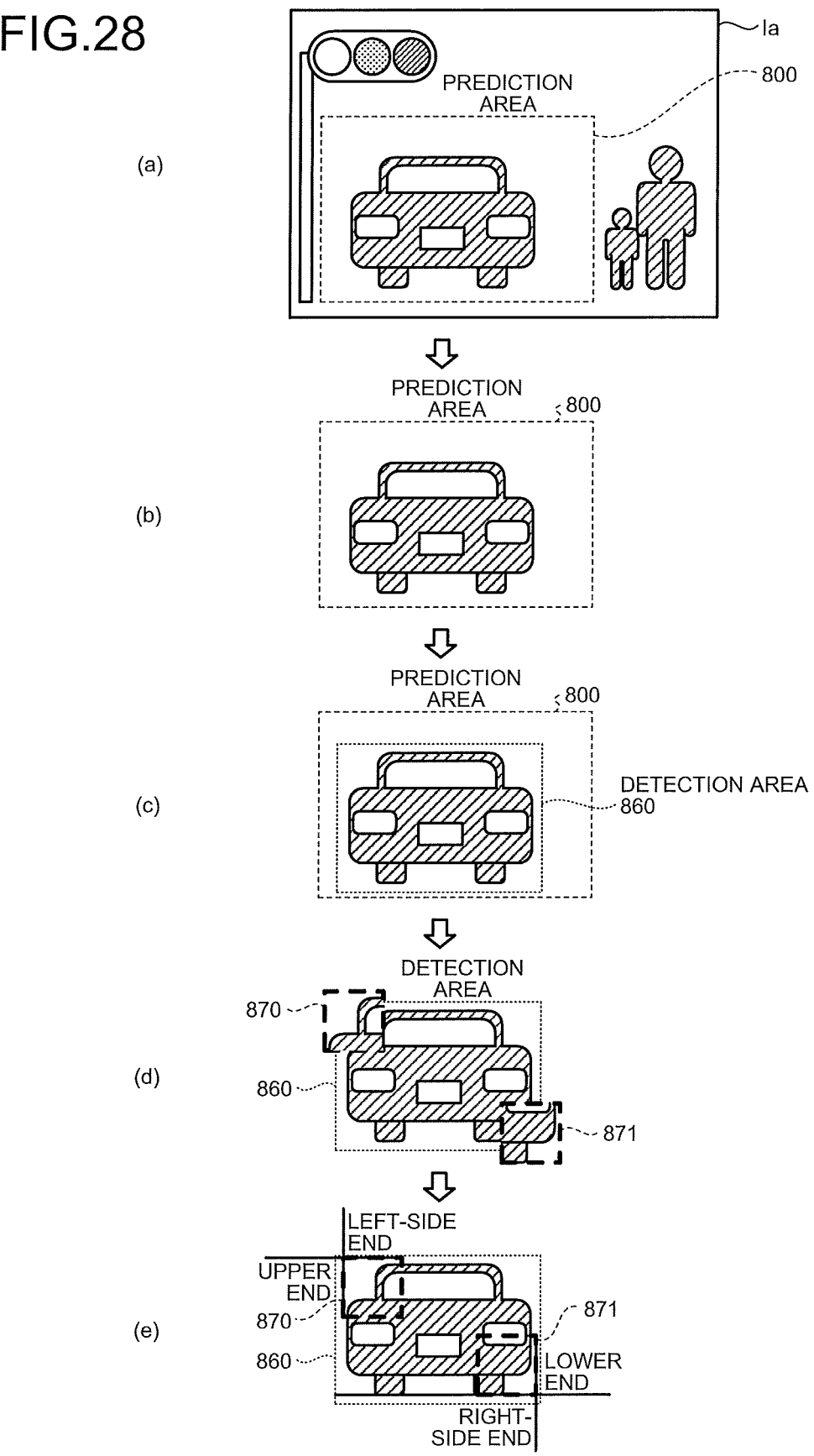
FIG. 28 is a diagram for explaining the parts-matching processing.

FIG. 27 is a flowchart for explaining an example of the operation in the parts-matching processing performed as part of the tracking processing of the tracking unit according to the embodiment. FIG. 28 is a diagram for explaining the parts-matching processing. Thus, explained with reference to FIGS. 27 and 28 is a flow of operation in the parts-matching processing performed by the matching unit 610 as part of the tracking processing. The parts-matching processing illustrated in FIG. 27 represents the parts-matching processing performed at Step S123 illustrating in FIG. 18.

<Step S1231>

The third thinning unit 615 of the matching unit 610 performs thinning processing with respect to the image of the prediction area 800 (see FIG. 28b), which is in the current frame predicted by the movement predicting unit 600 (i.e., in the reference image Ia illustrated at (a) in FIG. 28), based on a predetermined thinning amount (for example, a thinning amount smaller than the thinning amount used by the first thinning unit 612); and obtains a thinning prediction area. More particularly, the third thinning unit 615 refers to the ratio for the previous frame as stored in the RAM 54 by the second updating unit 634 (refer to Step S147 illustrated in FIG. 24), and performs thinning processing with respect to the prediction area in a manner similar to Step S1221 illustrated in FIG. 21.

In this way, the ratio of thinning implemented by the third thinning unit 615 with respect to the prediction area 800 in the current frame is identical to the ratio of thinning implemented by the fourth thinning unit 633 with respect to the detection area in the previous frame. In case the prediction area 800 is subjected to thinning using a different thinning ratio; then, even if template matching is performed with respect to an object having the same size as the original object, the size of the object differs in the thinning prediction area, and the object cannot be detected with accuracy. In that regard, since the thinning prediction area is created by thinning the prediction area 800 at the same ratio of thinning, the object can be detected with accuracy. Then, the system control proceeds to Step S1232.

<Step S1232>

The second template matching unit 616 of the matching unit 610 performs template matching in the thinning prediction area, which has been subjected to thinning in the current frame by the third thinning unit 615, based on the thinning template updated in the previous frame by the second updating unit 634. That is, the second template matching unit 616 detects, in the thinning prediction area, an image that is identical or that can be regarded to be identical to the thinning template. Herein, as the evaluation value indicating the degree of similarity with the thinning template, it is possible to use the SAD. The second template matching unit 616 performs raster scan in the thinning prediction area, and at the same time calculates the SAD based on the thinning template and obtains the position of the image having the smallest SAD. As the position of the image having the smallest SAD in the thinning prediction area, for example, a position of the top left end of that image in the thinning prediction area is obtained.

Moreover, regarding the frame of an image obtained by restoring the frame of the detected image to the pre-thinning size, the second template matching unit 616 calculates, using (Equation 5) given earlier, the position in the prediction area 800 from the position of the image detected in the thinning prediction area.

As a result, the second template matching unit 616 can obtain, in the current frame, the position of the frame of an image (a detection area 860 illustrated at (c) in FIG. 28) of the object detected in the prediction area 800. In this way, with respect to the thinning prediction area that has been subjected to thinning, the second template matching unit 616 performs template matching with the thinning template that has been subjected to thinning using the same thinning amount. Hence, image processing can be performed with respect to the images having a smaller pixel count than the original frame, thereby enabling achieving enhancement in the processing speed.

However, the position of the detection area as obtained in the prediction area 800 represents the position obtained by restoring, to the pre-thinning size, the image detected as a result of template matching performed in the thinning prediction area formed by thinning of the prediction area 800. Hence, a quantization error happens to be included. Subsequently, the system control proceeds to Step S1233.

<Step S1233>

The third template matching unit 617 of the matching unit 610 performs template matching in the detection area 860, which is detected in the current frame as a result of template matching performed by the second template matching unit 616, based on two parts-templates (parts-templates 870 and 871 illustrated at (d) in FIG. 28) updated in the previous frame by the third updating unit 636. That is, the third template matching unit 617 detects, in the detection area 860, images that are identical to or that can be regarded to be identical to (hereinafter, simply referred to as "identical to") the parts-templates 870 and 871. Herein, the parts-templates 870 and 871 correspond to the in-temporary-frame images 850a and 851, respectively, illustrated at (b) in FIG. 26. In the detection area 860, as the evaluation values indicating the degrees of similarity with the parts-templates 870 and 871, it is possible to use the SADs. The third template matching unit 617 performs raster scan in the detection area 860, and at the same time calculates the SADs based on the parts-templates 870 and 871 and obtains the positions of the images having the smallest SADs.

Subsequently, as illustrated at (e) in FIG. 28, the third template matching unit 617 corrects the detection area 860 based on the positions of such images in the detection area 860 which are identical to the parts-templates 870 and 871 (at (e) in FIG. 28, the matching positions are illustrated at the positions of the parts-templates 870 and 871). More particularly, as illustrated at (e) in FIG. 28, in the detection area 860, the third template matching unit 617 sets the X direction coordinates of the position of the top left end of the image identical to the parts-template 870 as the position of the left-side end of the post-correction detection area, and sets the corresponding Y direction coordinates as the position of the upper end of the post-correction detection area. Similarly, as illustrated at (e) in FIG. 28, in the detection area 860, the third template matching unit 617 sets the X direction coordinates of the position of the bottom right end of the image identical to the parts-template 871 as the position of the right-side end of the post-correction detection area, and sets the corresponding Y direction coordinates as the lower end of the post-correction detection area. In this way, the third template matching unit 617 sets, as the post-correction detection area, the area defined by the left-side end, the upper end, the right-side end, and the lower end as obtained with respect to the detection area 860 based on the parts-templates 870 and 871. In this way, the post-correction detection area obtained with respect to the detection area 860 by the third template matching unit 617 represents the detection area that is eventually detected as a result of the parts-matching processing performed by the matching unit 610. Then, the third template matching unit 617 specifies, in the recognition area information of the detected object, information about the detection area of the detected object (i.e., information such as the position and the size with respect to the frame).

In this way, as a result of the correction processing performed by the third template matching unit 617, the four corners of the eventual detection area can be decided with accuracy, and in turn the quantization error can be moderated. As a result, tracking can be performed in a stable manner even with respect to an object at a long distance. Moreover, since the template matching by the second template matching unit 616 is performed not with respect to the entire frame but only with respect to the prediction area 800, the processing speed can be enhanced. Herein, it marks the end of the parts-matching processing.

According to the processing from Step S1231 to Step S1233, the matching unit 610 performs the parts-matching processing.

As described above, in the tracking processing performed in the object recognizing device 1 according to the embodiment, the type of the matching processing is changed according to the distance to the object. That is, when the distance to the object is a short distance, the pixel count of the detection area is large. Hence, the rough matching processing is performed that includes template matching using a thinning prediction area, which is formed as a result of significant thinning of pixels, and using a thinning template. On the other hand, when the distance to the object is a long distance, the parts-matching processing in which template matching is performed using a thinning prediction area and a thinning template, to identify the approximate size of the object similarly to the rough matching processing, and then template matching is performed based on a parts-template, is performed. In the case of a short distance to the object, there are greater changes in the orientation of the object as compared to the case of a long distance to the object. Hence, if the parts-matching processing is performed, then the parts-template may get created in the portion of an object that is not to be originally tracked. For that reason, in the case of a short distance, instead of performing the parts-matching processing, the rough matching processing is performed that enables achieving enhancement in the detection accuracy of the detection area as a result of correction of the frame. In the case of a long distance to the object, the parallax values in the detection area are often unstable, thereby leading to a possibility that the boundary of the detection area also becomes unstable. For that reason, in the case of a long distance, instead of performing the rough matching processing, the parts-matching processing is performed that enables achieving enhancement in the detection accuracy of the detection area as a result of correction according to the template matching using a parts-template. In this way, by selecting a preferable or the most suitable matching method according to the distance to the object, the accuracy of detection of the object can be enhanced. Particularly, in the case of a short distance to the object, since the pixel count of the detection area is large, template matching is performed after performing significant thinning of the pixels. Hence, the processing speed of the matching processing can be enhanced. In the case of an intermediate distance to the object, template matching based on a parts-template is performed. Hence, the detection area can be obtained with accuracy.

Meanwhile, in the rough matching processing as well as the parts-matching processing of the matching processing, since template matching including the thinning processing is performed, the processing speed can be enhanced. Moreover, after the detection of the detection area as a result of post-thinning template matching, the correcting unit 614 performs frame correction with respect to the detection area and the third template matching unit 617 performs correction processing based on template matching using parts-templates. With that, the detection area can be obtained with accuracy. Consequently, the tracking accuracy can be enhanced.

Meanwhile, in the embodiment described above, although the explanation is given for an example in which a vehicle represents the object to be subjected to the tracking processing, but is not limited thereto and the embodiment is effective also regarding tracking processing to be performed with respect to an object having only a small change in the shape similarly to a vehicle.

Moreover, in the embodiment described above, although the cost value C is an evaluation value representing the degree of dissimilarity, it can alternatively be an evaluation value representing the degree of similarity. In that case, the shift amount d corresponding to the greatest cost value C (extreme value), which represents the degree of similarity, serves as the parallax value dp.

Furthermore, in the embodiment described above, the object recognizing device 1 that is installed in an automobile represented by the vehicle 70 is explained, but is not limited thereto. Alternatively, for example, the object recognizing device 1 can be installed in some other type of vehicle such as a motorbike, a bicycle, a wheelchair, or a farming tiller. Moreover, instead of treating a vehicle as an example of a moving object, a robot can also be used.

Meanwhile, in the embodiment described above, when at least some of the functional units of the parallax value deriving unit 3 and the recognizing unit 5 in the object recognizing device 1 are implemented as a result of execution of a program, that program is stored in advance in a ROM. Alternatively, the program executed in the object recognizing device 1 according to the embodiment described above can be recorded as an installable file or an executable file in a computer-readable recording medium such as a CD-ROM, a flexible disk (FD), a CD-R (Compact Disk Recordable), or a DVD (Digital Versatile Disc). Still alternatively, the program executed in the object recognizing device 1 according to the embodiment described above can be stored in a downloadable manner in a computer connected to a network such as the Internet. Still alternatively, the program executed in the object recognizing device 1 according to the embodiment described above can be distributed via a network such as the Internet. Meanwhile, the program executed in the object recognizing device 1 according to the embodiment described above contains modules of at least some of the functional units explained earlier. As far as the actual hardware is concerned, the CPU 52 (or the CPU 32) reads the program from the ROM 53 (or the ROM 33) and executes it so that the functional units are loaded and generated in a main memory device (the RAM 54 (or the RAM 34).

According to an embodiment, it becomes possible to enhance the object detection accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST 1 object recognizing device
2 main body
3 parallax value deriving unit
4 communication line
5 recognizing unit
6 vehicle control device
7 steering wheel
8 brake pedal
10a, 10b imaging unit
11a, 11b imaging lens
12a, 12b aperture
13a, 13b image sensor
20a, 20b signal converting unit
21a, 21b CDS
22a, 22b AGC
23a, 23b ADC
24a, 24b frame memory
30 image processing unit
31 FPGA
32 CPU
33 ROM
34 RAM
35 I/F
39 bus line
51 FPGA
52 CPU
53 ROM
54 RAM
55 I/F
58 CAN I/F 59 bus line
60 device control system
70 vehicle
100a, 100b image obtaining unit
200a, 200b converting unit
300 parallax value computing unit
301 cost calculating unit
302 decider
303 first generating unit
500 second generating unit
510 clustering unit
520 tracking unit
600 movement predicting unit
610 matching unit
611 determining unit
612 first thinning unit
613 first template matching unit
614 correcting unit
615 third thinning unit
616 second template matching unit
617 third template matching unit
620 checking unit
630 feature updating unit
631 second thinning unit
632 first updating unit
633 fourth thinning unit
634 second updating unit
635 parts-template selecting unit
636 third updating unit
640 state transition unit
700 road surface
700a road surface portion
701 utility pole
701a utility pole portion
702 vehicle
702a vehicle portion
711 left-side guardrail
711a, 711b left-side guardrail portion
712 right-side guardrail
712a, 712b right-side guardrail portion
713 vehicle
713a, 713b vehicle portion
714 vehicle
714a, 714b vehicle portion
721 to 724 detection area
721a to 724a detection frame
800 prediction area
801 thinning prediction area
810 detection area
811 thinning template
820, 821 detection frame
830 detection area
840, 840a, 841 temporary frame
850, 850a, 851 in-temporary-frame image
860 detection area
870, 871 parts-template
900, 901 histogram
B base length
C cost value
d shift amount
dp parallax value
E object
EL epipolar line
f focal length
Ia reference image
Ib comparison image
Ip parallax image
p reference pixel
pb reference area
q candidate pixel
qb candidate area
RM real U map
S, Sa, Sb point
Th threshold value
UM U map
VM V map
Z distance

What is claimed is:

1. An image processing device comprising:
predicting circuitry configured to, from a position of an object in a previous frame with respect to a current frame, predict a position of the object in the current frame and identify a prediction area;
determining circuitry configured to determine whether the object is present in a first distance area or in a second distance area which is farther than the first distance area, based on a distance to the object in the previous frame;
first matching circuitry configured to perform template matching in the prediction area in the current frame using a first template regarding the object in the previous frame, to detect the object, when the determining circuitry determines that the object is present in the first distance area; and
second matching circuitry configured to perform template matching in the prediction area in the current frame using a second template which is different than the first template and which is regarding the object in the previous frame, to detect the object, when the determining circuitry determines that the object is present in the second distance area,
wherein:
the determining circuitry is configured to determine whether the object is present in the first distance area or in the second distance area, based on the distance to the object according to distance information,
the first matching circuitry is configured to detect the object by performing the template matching in the current frame using the first template regarding a first detection area of the object in the previous frame, and correct a second detection area of the detected object based on distance information of the second detection area, when the determining circuitry determines that the object is present in the first distance area, and
the second matching circuitry is configured to detect the object by performing the template matching in the current frame using the second template regarding a third detection area of the object in the previous frame, and correct a size of a fourth detection area of the detected object based on a partial image of the third detection area, when the determining circuitry determines that the object is present in the second detection area.

2. The image processing device according to claim 1, wherein the first matching circuitry is configured to perform template matching with respect to a thinning prediction area formed by performing thinning of pixels in the prediction area.

3. The image processing device according to claim 2, wherein the first matching circuitry is configured to correct detection error attributed to the thinning of the pixels, after performing the template matching with respect to the thinning prediction area formed by performing the thinning of the pixels in the prediction area, to detect the object.

4. The image processing device according to claim 1, wherein:
the first matching circuitry is configured to perform the template matching using a non-partial template of the object, regarding the object in the previous frame, to detect the object, and
the second matching circuitry is configured to perform the template matching using a partial template of the object, regarding the object in the previous frame, to detect the object.

5. The image processing device according to claim 4, wherein the second matching circuitry is configured perform the template matching using a template of a corner part of the object, regarding the object in the previous frame, to detect the object.

6. The image processing device according to claim 1, wherein the second matching circuitry is configured to perform the template matching with respect to a thinning prediction area formed by performing thinning of pixels in the prediction area, and correct a detection error which is attributed to the thinning of the pixels, using the partial template of the object, to detect the object.

7. The image processing device according to claim 1, wherein the first matching circuitry is configured to correct a size of the second detection area based on a frequency of distance information corresponding to the second detection area.

8. The image processing device according to claim 1, wherein the second matching circuitry is configured to correct a size of the fourth detection area based on a position of a portion which matches with the partial image, in the fourth detection area.

9. The image processing device according to claim 1, wherein:
the first matching circuitry is configured to perform the template matching in the prediction area using the first template, and
the second matching circuitry is configured to perform the template matching in the prediction area using the second template.

10. The image processing device according to claim 9, wherein:
the first matching circuitry is configured to perform thinning of the prediction area by a first thinning amount and, in the prediction area after the thinning, perform the template matching using the first template formed by performing thinning of the first detection area by the first thinning amount, and
the second matching circuitry is configured to perform thinning of the prediction area by a second thinning amount and, in the prediction area after the thinning, perform the template matching using the second template formed by performing thinning of the third detection area by the second thinning amount.

11. The image processing device according to claim 10, wherein the first matching circuitry is configured to perform the thinning of the prediction area by the first thinning amount that is greater than the second thinning amount.

12. The image processing device according to claim 10, further comprising:
first thinning circuitry configured to perform the thinning of the first detection area which is rectangular in shape, by the first thinning amount such that either a length in a height direction or a length in a width direction becomes equal to a fixed length, to create the first template; and
second thinning circuitry configured to perform the thinning of the third detection area which is rectangular in shape, by the second thinning amount such that either a length in a height direction or a length in a width direction becomes equal to a fixed length, to create the second template.

13. The image processing device according to claim 1, further comprising:
selecting circuitry configured to place a temporary frame at an end of the third detection area in the third detection area of the object in the previous frame, and select the temporary frame as the partial image, when parallax values included in the temporary frame become equal to or greater than a predetermined ratio while shifting the temporary frame toward an inside of the third detection area.

14. An object recognizing device comprising:
first imaging circuitry configured to capture a photographic subject to obtain a first taken image;
second imaging circuitry disposed at a different position than a position of the first imaging circuitry and configured to capture the photographic subject to obtain a second taken image;
generating circuitry configured to generate the distance information based on parallax values obtained with respect to the photographic subject from the first taken image and the second taken image;
detecting circuitry configured to newly detect an object based on the first taken image or the second taken image and based on the distance information; and
the image processing device according to claim 1.

15. A device control system comprising:
the object recognizing device according to claim 14; and
a control device configured to control a control target based on information about the object detected by the object recognizing device.

16. A moving object comprising the device control system according to claim 15, the moving object being configured to be controlled by the control device.

17. An image processing method comprising:
predicting, from a position of an object in a previous frame with respect to a current frame, a position of the object in the current frame, to identify a prediction area;
determining whether the object is present in a first distance area or in a second distance area which is farther than the first distance area, based on a distance to the object in the previous frame;
first matching including performing template matching in the prediction area in the current frame using a first template regarding the object in the previous frame, to detect the object, when it is determined that the object is present in the first distance area; and
second matching including performing template matching in the prediction area in the current frame using a second template which is different than the first template and which is regarding the object in the previous frame, to detect the object, when it is determined that the object is present in the second distance area,
wherein:
the determining determines whether the object is present in the first distance area or in the second distance area, based on the distance to the object according to distance information,
the first matching is configured to detect the object by performing the template matching in the current frame using the first template regarding a first detection area of the object in the previous frame, and correct a second detection area of the detected object based on distance information of the second detection area, when the determining determines that the object is present in the first distance area, and the second matching is configured to detect the object by performing the template matching in the current frame using the second template regarding a third detection area of the object in the previous frame, and correct a size of a fourth detection area of the detected object based on a partial image of the third detection area, when the determining determines that the object is present in the second detection area.

18. The image processing method according to claim 17, wherein the first matching performs template matching with respect to a thinning prediction area formed by performing thinning of pixels in the prediction area.

19. A non-transitory computer-readable medium including programmed instructions that cause a computer to function as:

predicting circuitry configured to, from a position of an object in a previous frame with respect to a current frame, predict a position of the object in the current frame, and identify a prediction area;

determining circuitry configured to determine whether the object is present in a first distance area or in a second distance area which is farther than the first distance area, based on a distance to the object in the previous frame;

first matching circuitry configured to perform template matching in the prediction area in the current frame using a first template regarding the object in the previous frame, to detect the object, when the determining circuitry determines that the object is present in the first distance area; and second matching circuitry configured to perform template matching in the prediction area in the current frame using a second template which is different than the first template and which is regarding the object in the previous frame, to detect the object, when the determining circuitry determines that the object is present in the second distance area, wherein:

the determining circuitry is configured to determine whether the object is present in the first distance area or in the second distance area, based on the distance to the object according to distance information, the first matching circuitry is configured to detect the object by performing the template matching in the current frame using the first template regarding a first detection area of the object in the previous frame, and correct a second detection area of the detected object based on distance information of the second detection area, when the determining circuitry determines that the object is present in the first distance area, and the second matching circuitry is configured to detect the object by performing the template matching in the current frame using the second template regarding a third detection area of the object in the previous frame, and correct a size of a fourth detection area of the detected object based on a partial image of the third detection area, when the determining circuitry determines that the object is present in the second detection area.

20. The non-transitory computer-readable medium according to claim 19, wherein the first matching circuitry is configured to perform template matching with respect to a thinning prediction area formed by performing thinning of pixels in the prediction area.

* * * * *